US007036012B2

(12) United States Patent
Charrin

(10) Patent No.: US 7,036,012 B2
(45) Date of Patent: Apr. 25, 2006

(54) METHOD AND SYSTEM FOR SECURE CASHLESS GAMING

(75) Inventor: Philippe A. Charrin, Los Angeles, CA (US)

(73) Assignee: Smart Card Integrators, Inc., Los Angeles, CA (US)

( * ) Notice: Subject to any disclaimer, the term of this patent is extended or adjusted under 35 U.S.C. 154(b) by 427 days.

(21) Appl. No.: 09/992,831

(22) Filed: Nov. 13, 2001

(65) Prior Publication Data

US 2002/0034299 A1 Mar. 21, 2002

Related U.S. Application Data

(63) Continuation of application No. 09/456,021, filed on Dec. 3, 1999, now Pat. No. 6,577,733.

(51) Int. Cl.
*H04L 9/00* (2006.01)

(52) U.S. Cl. ........................ 713/169; 380/44; 380/251; 235/380; 463/25; 726/9; 726/20

(58) Field of Classification Search .................. 380/44, 380/251; 713/169; 235/380; 463/25; 726/9, 726/20

See application file for complete search history.

(56) References Cited

U.S. PATENT DOCUMENTS 4,072,930 A 2/1978 Lucero et al. .............. 340/152
5,036,461 A 7/1991 Elliott et al. .................. 705/44
5,038,022 A 8/1991 Lucero ........................ 235/380
5,179,517 A 1/1993 Sarbin et al. ............... 364/410

(Continued)

FOREIGN PATENT DOCUMENTS

AU A-72657/91 9/1991

(Continued)

OTHER PUBLICATIONS

Schneier, "Applied Cryptography, Second Edition," Sections 22.1 through 22.5, pp. 513-522, 1996.

*Primary Examiner*—Matthew Smithers
*Assistant Examiner*—Paul Callahan
(74) *Attorney, Agent, or Firm*—Irell & Manella LLP

(57) ABSTRACT

A secure cashless gaming system comprises a plurality of gaming devices which may or may not be connected to a central host network. Each gaming device includes an intelligent data device reader which is uniquely associated with a security module interposed between the intelligent data device reader and the gaming device processor. A portable data device bearing credits is used to allow players to play the various gaming devices. When a portable data device is presented to the gaming device, it is authenticated before a gaming session is allowed to begin. The intelligent data device reader in each gaming device monitors gaming transactions and stores the results for later readout in a secure format by a portable data extraction unit, or else for transfer to a central host network. Gaming transaction data may be aggregated by the portable data extraction unit from a number of different gaming devices, and may be transferred to a central accounting and processing system for tracking the number of remaining gaming credits for each portable data unit and/or player. Individual player habits can be monitored and tracked using the aggregated data. The intelligent data device reader may be programmed to automatically transfer gaming credits from a portable data device the gaming device, and continually refresh the credits each time they drop below a certain minimum level, thus alleviating the need for the player to manually enter an amount of gaming credits to transfer to the gaming device.

14 Claims, 20 Drawing Sheets

U.S. PATENT DOCUMENTS

| | | | | |
|---|---|---|---|---|
| 5,225,664 | A | 7/1993 | Iijima | 235/380 |
| 5,265,874 | A | 11/1993 | Dickinson et al. | 273/138 |
| 5,276,312 | A | 1/1994 | McCarthy | 235/380 |
| 5,293,424 | A | 3/1994 | Holtey et al. | 713/193 |
| 5,326,104 | A | 7/1994 | Pease et al. | 273/138 |
| 5,371,345 | A | 12/1994 | LeStrange et al. | 235/380 |
| 5,429,361 | A | 7/1995 | Raven et al. | 273/138 |
| 5,470,079 | A | 11/1995 | LeStrange et al. | 273/138 |
| 5,531,309 | A | 7/1996 | Kloss et al. | 194/202 |
| 5,575,374 | A | 11/1996 | Orus et al. | 194/213 |
| 5,580,310 | A | 12/1996 | Orus et al. | 463/16 |
| 5,602,918 | A | 2/1997 | Chen et al. | 713/153 |
| 5,630,755 | A | 5/1997 | Walsh et al. | 463/25 |
| 5,655,966 | A | 8/1997 | Werdin, Jr. et al. | 463/25 |
| 5,697,482 | A | 12/1997 | Orus et al. | 194/213 |
| 5,706,925 | A | 1/1998 | Orus et al. | 194/214 |
| 5,850,447 | A | 12/1998 | Peyret | 380/25 |
| 5,919,091 | A | 7/1999 | Bell et al. | 463/25 |
| 6,012,832 | A | 1/2000 | Saunders et al. | 364/410 |
| 6,117,013 | A | 9/2000 | Eiba | 463/41 |
| 6,851,607 | B1 * | 2/2005 | Orus et al. | 235/380 |

FOREIGN PATENT DOCUMENTS

| | | | |
|---|---|---|---|
| AU | B-44536/93 | | 3/1995 |
| AU | B-33489/95 | | 3/1996 |
| DE | 4201293 | A1 | 7/1993 |
| DE | 19502613 | A1 | 8/1996 |
| DE | 19623590 | A1 | 12/1997 |
| DE | 19624797 | A1 | 1/1998 |
| DE | 19701298 | A1 | 7/1998 |
| DE | 19701300 | | 7/1998 |
| DE | 19701301 | | 7/1998 |
| EP | 0 360 613 | B1 | 3/1990 |
| FR | 2 766 947 | | 2/1999 |
| GB | 2 294 348 | A | 4/1996 |
| GB | 2 296 361 | A | 6/1996 |
| WO | WO 98/06070 | | 2/1998 |
| WO | WO 98/47113 | | 10/1998 |
| WO | WO 98/47114 | | 10/1998 |
| WO | WO 98/59311 | | 12/1998 |
| WO | WO 99/06971 | | 2/1999 |
| WO | WO 99/06973 | | 2/1999 |
| WO | WO99/06973 | | 2/1999 |

* cited by examiner

TRANSACTION LIST RECORD FORMAT

USER CARD MAPPING

| | PLAYER | ISSUE | EXP. | TITLE | LAST | MIDDLE | FIRST | RETAIN | CARD | CASINO | LANGUAGE |
|---|---|---|---|---|---|---|---|---|---|---|---|
| FIELD | ID | DATE | DATE | | NAME | INITIAL | NAME | VALUE | NUM | ID | ID |
| CODE | BCD | DATE | DATE | ASC | ASC | ASC | ASC | HEX | BCD | BCD | HEX |
| | 0-- | YY-MM- | YY-MM- | | | | | | | | |
| FORMAT | 999999 | DD | DD | | | | | | | | |
| BYTES | 3 | 3 | 3 | 3 | 20 | 1 | 20 | 4 | 4 | 4 | 1 |

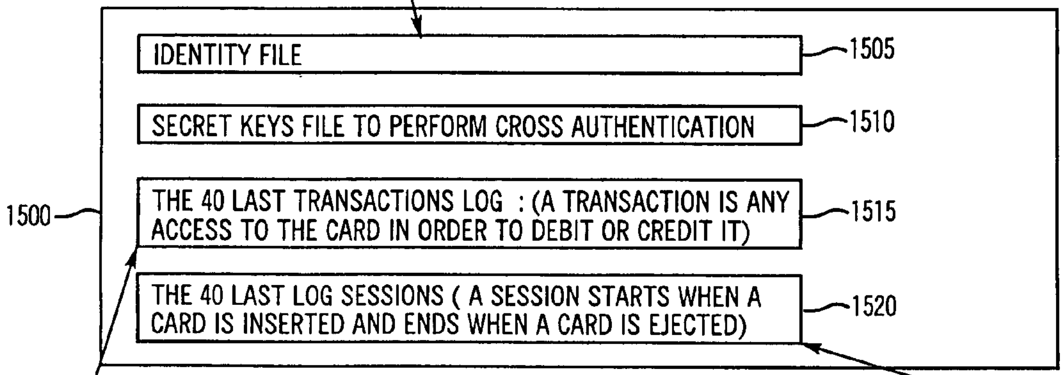

| | SESSION | MACHINE | TRANSACT | CARD | CUMM. | CUMM. | CUMM. |
|---|---|---|---|---|---|---|---|
| FIELD | NUMBER | ID | TYPE | VALUE | OUT | PLAYED | WON |
| CODE | HEX | HEX | HEX | HEX | HEX | HEX | HEX |
| | 0-- | | | | | | |
| FORMAT | 9999 | | | | | | |
| BYTES | 2 | 4 | 2 | 4 | 4 | 4 | 4 |

| | SESSION | MACHINE | TRANSACT | CARD | CUMM. | CUMM. | CUMM. |
|---|---|---|---|---|---|---|---|
| FIELD | NUMBER | ID | TYPE | VALUE | OUT | PLAYED | WON |
| CODE | HEX | HEX | HEX | HEX | HEX | HEX | HEX |
| | 0-- | | | | | | |
| FORMAT | 9999 | | | | | | |
| BYTES | 2 | 4 | 2 | 4 | 4 | 4 | 4 |

FIG. 15.

METHOD AND SYSTEM FOR SECURE CASHLESS GAMING

CROSS REFERENCE TO RELATED APPLICATIONS

This application is a continuation of U.S. application Ser. No. 09/456,021, filed on Dec. 3, 1999 now U.S. Pat. No. 6,577,733. The foregoing application is hereby incorporated by reference as if set forth fully herein.

BACKGROUND OF THE INVENTION

1. Field of the Invention

The field of the present invention relates to gaming devices and systems and, more particularly, to secure cashless gaming devices and systems utilizing portable data storage devices such as smartcards.

2. Background

Casinos and gaming establishments have traditionally relied upon coin-operated gaming devices. Such coin-operated gaming devices have a number of drawbacks or limitations. For example, they generally require customers to carry around large numbers of coins, which can be inconvenient or burdensome to customers. Also, the only type of feedback they provide to the machine owner is the raw number of coins played and paid out. Thus, coin-operated gaming devices have no way to track the type of customers using the machines. Such information, if available, could be of significant value to the casinos and gaming establishments.

To increase the convenience to customers, and to make an attempt at tracking game machine use by individual customers, casinos and gaming establishments have for a number of years sought to provide a cashless gaming system, whereby the customers do not have to play the machines using coins and hence need not carry around large quantities of coins. Some proposed systems, for example, allow customers to use gaming establishment credit cards to transfer playing credits to, and retrieve unused credits from, a particular gaming machine. A similar proposed system allows use of a player-carried device such as a magnetic-stripe card to allow customers to use coin-operated game devices by paying a lump sum in lieu of using individual coins. Such a system is described, for example, in U.S. Pat. No. 4,575,622.

Yet another proposed approach is described in U.S. Pat. No. 5,179,517, which discloses a system in which a credit account for a particular customer is maintained on a portable data carrier commonly known as a "smart card." A smart card is a device generally in the size and shape of a standard credit card, encapsulating solid-state memory, circuitry for allowing the memory to be read from or written to, and, in certain cards, microprocessor circuitry for performing various programmable functions. Smart cards may be equipped with an interface having electrical contacts which make a physical connection with a smart card reader, or else may be equipped with a radio frequency (RF) interface to allow a smart card reader to interact with the smart card electronic circuitry over an RF communication link. A standard (ISO) protocol has been developed within the smart card industry for communicating between smart cards and smart card readers.

Cashless gaming systems are most often deployed in an environment in which the various gaming devices are all connected to and controlled by a central computer, which serves as the host for a local area network, and such systems are referred to as "on-line" systems. While on-line gaming systems have certain advantages such as centralized control and player tracking capability, they can create a "bottleneck" at the central computer when too many transactions need to be processed due, for example, to the number of on-line gaming devices being played simultaneously. On-line gaming systems are also more expensive than so-called "off-line" gaming devices, which are not directly tied to a host computer or a network. One probable reason that most cashless gaming systems have been developed for on-line (rather than off-line) gaming devices is because of the ability of the central computer to account for changes to the player's account and the machine's payment in/payment out during play, by instantly adjusting accounting data relating to the player and/or the gaming device which is being played. Accurate centralized accounting is highly important, because when machines can be played with coins or with credit (via a cashless technique), the number of coins in and out will not necessarily reflect the total intake or payout of a gaming device. Rather, the influx of cashless "credits" in a gaming device would, in the absence of careful monitoring, cause a discrepancy in the accounting for each gaming device. In an on-line gaming system, each bet and each pay-out is typically run through the central computer, which is thereby able to keep a running account of the monetary balance at each gaming device.

On the other hand, such a capability does not exist with off-line gaming devices, since they are not connected to a central computer. Accounting for off-line machines is usually conducted by manually checking various meters at the gaming device. When the number of off-line machines is large, meter checking can be a long and tedious process. It can also be inconvenient to the casinos or gaming establishments, as it requires that the gaming devices be taken off line for a certain period of time during meter checking activity.

While cashless gaming techniques have been proposed for off-line gaming devices, such techniques are inadequate from a security and accounting standpoint. A major potential security problem is the possibility of theft of cashless data unit (e.g., smart card) readers, particularly by employees of the casinos or gaming establishments. In this regard, it may be noted that a high percentage of casino theft is estimated to be caused by internal company employees. With a stolen data unit reader, an individual can illegally add money in the form of credits to one or more cashless data units. The individual could then "cash out" the amount of credit on the cashless data units, without the casino or gaming establishment being aware that the money was illegally added to the cashless data units. The possibility of such covert action puts casinos and gaming establishments at untoward risk of being bilked of large amounts of money. This possibility is generally not present in an on-line system, which requires all transactions to be processed through the central computer.

Another drawback of conventional off-line gaming devices is that they are generally incapable of providing the same level of accounting and targeted player feedback as on-line gaming systems. With conventional techniques, there is no practical and viable way for casinos and gaming establishments issuing portable data units (such as smart cards) to determine their outstanding liability on a given portable data unit. Also, there is no practical and viable way to obtain accurate, timely and comprehensive information as to the playing habits of individual players, which, as noted, could be of significant value to casinos and gaming establishments.

There is a need for a cashless gaming system particularly well suited for off-line gaming devices. There is further a need for a cashless gaming system which provides increased security for off-line gaming devices. There is further a need for such a cashless gaming system which allows rapid and convenient accounting for off-line gaming devices, and which allows information to be gathered concerning the playing habits of individual players. There is also a need for a cashless gaming system that reduces the probability of bottlenecks occurring at the central computer in an on-line gaming system, and further for such a system which can provide an increased level of security for on-line gaming devices.

SUMMARY OF THE INVENTION

The invention provides in one aspect systems, methods and techniques for secure cashless gaming which can be used with off-line or on-line gaming devices. In one or more embodiments, gaming credits are stored on portable data devices such as smart cards, which can be presented to gaming devices in a cashless gaming environment to allow players to use the gaming devices.

In one embodiment, a secure cashless gaming system comprises a plurality of gaming devices which may or may not be connected to a central host network. Each gaming device preferably includes an intelligent data device reader which is uniquely associated with a security module interposed between the intelligent data device reader and the gaming device processor. A portable data device (such as a smart card) bearing credits is used to allow players to play the various gaming devices. When a portable data device is presented to the gaming device, it is authenticated before a gaming session is allowed to begin. The intelligent data device reader in each gaming device monitors gaming transactions and preferably stores the results for later read-out in a secure format by a portable data extraction unit, or else for transfer to a central host network. Gaming transaction data may be aggregated by the portable data extraction unit from a number of different gaming devices, and may be transferred to a central accounting and processing system for tracking the number of remaining gaming credits for each portable data unit and/or player. Individual player habits can be monitored and tracked using the aggregated data.

In another embodiment, a gaming device includes an intelligent data device reader which is uniquely associated with a security module interposed between the intelligent data device reader and the gaming device processor. Each time an attempt is made to initiate a gaming session (by, e.g., presenting a portable data device such as a smart card), and periodically thereafter, if desired, an authentication process is performed to ensure that the correct intelligent data device reader and the correct security module are present. If one or the other is missing, then the player will be unable to utilize the gaming device, and the portable data device will not be updated.

The intelligent data device reader may, in certain embodiments, be programmed to automatically transfer gaming credits from a portable data device inserted in the intelligent data device reader to the gaming device. Each time the number of credits falls below a predetermined minimum level, the intelligent data device reader may be programmed to transfer a given number of additional gaming credits to the gaming device, thus alleviating the need for the player to manually enter an amount of gaming credits to transfer to the gaming device.

Further embodiments, variations and enhancements of the invention are also described herein.

BRIEF DESCRIPTION OF THE DRAWINGS

FIG. 15 is a diagram of a portable data device, illustrating the information storage format for the portable data device.

DETAILED DESCRIPTION OF PREFERRED EMBODIMENTS

Figure 1:
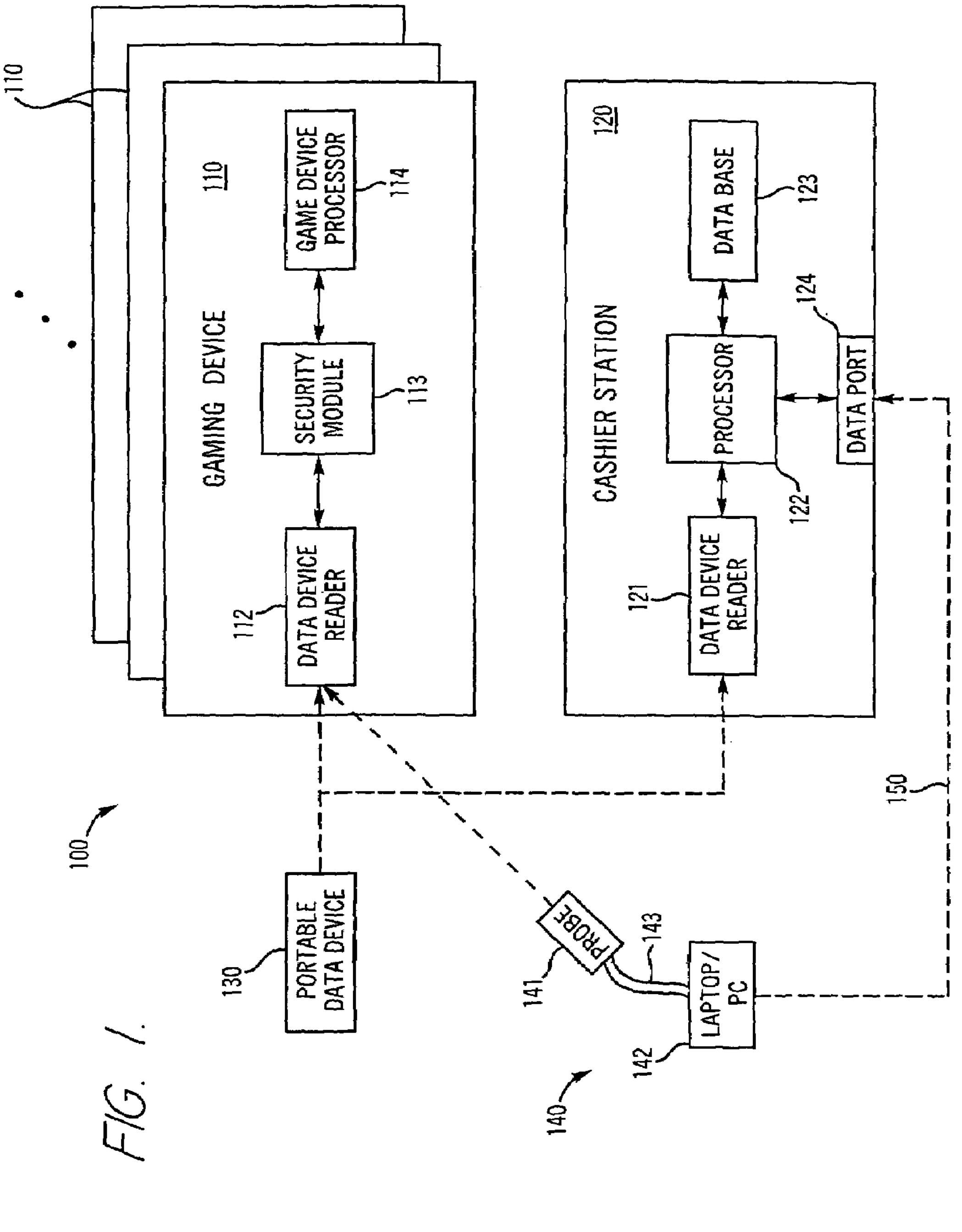
FIG. 1 is a block diagram of a secure cashless gaming system in accordance with a preferred embodiment as described herein.

FIG. 1 is a block diagram of a secure cashless gaming system 100 in accordance with a preferred embodiment as described herein. As illustrated in FIG. 1, the secure cashless gaming system 100 comprises one or more gaming devices 110, a cashier station 120 and a data extraction device 140 which collectively provide for secure cashless gaming activity by an arbitrary number of players on various gaming devices 110, the ability to securely and accurately monitor the gaming activity at each of the gaming devices, and the ability, if desired, to track individual player gaming habits. In the typical environment which is contemplated, a large number of gaming devices 110 (in the order of tens or hundreds) may be included in the cashless gaming system 100, but the principles and concepts described herein do not depend upon any particular number of gaming devices 110 being utilized in the cashless gaming system 100.

As further illustrated in FIG. 1, each gaming device 110 preferably comprises an intelligent data device reader 112, a security module 113 connected to the intelligent data device reader 112, and a game device processor 114 connected to the security module 113. The cashier station 120 preferably comprises a data device reader 121, a cashier station processor 122 connected to the data device reader 121, and a database 123 accessible to the cashier station processor 122. The cashier station 120 also may comprise a data port 124 for receiving data from the data extraction device 140, or alternatively may comprise a disk drive (not shown) or other media reading device for receiving information from the data extraction device 140 via a portable storage medium (e.g., disk).

In an exemplary embodiment, the gaming devices 110 are off-line machines, in that they need not be connected to a central computer for handling each wagering transaction. However, it will be apparent that various concepts and principles of the secure cashless gaming system 100 illustrated in FIG. 1 would be applicable to gaming devices in an on-line gaming environment as well, and thus, in certain alternative embodiments, the gaming devices 110 may be on-line machines.

As will be described in further detail herein, a player utilizes a portable data device 130 to obtain gaming credit, and to expend the credit in the various gaming devices 110, while the system operator uses the data extraction device 140 to extract data from the gaming devices 110 concerning player wagers, winnings and other information about gaming sessions. In a preferred embodiment, the portable data device 130 comprises a smart card, which, as previously noted in the Background section herein, is a device generally in the size and shape of a standard credit card, encapsulating solid-state memory, circuitry for allowing the memory to be read from or written to, and, in a preferred embodiment as described herein, microprocessor circuitry for performing various programmable functions. As also noted previously, smart cards may be equipped with an interface having electrical contacts which make a physical connection with a smart card reader, or else, alternatively, may be equipped with a radio frequency (RF) interface to allow a smart card reader to interact with the smart card electronic circuitry over an RF communication link. Techniques for manufacturing smart cards, and for communicating between a smart card and a smart card reader via either physical contacts or an RF communication link, are well known and conventional.

Alternatively, rather than a smart card, the portable data device 130 may comprise another type of data storage and retrieval unit. An embodiment in which the portable data device 130 comprises a smart card is preferred, however, because of the ability, with on-board microprocessor circuitry, to imbue the smart card with intelligence, thereby facilitating some of the security and other features described elsewhere herein. Accordingly, the portable data device 130 may occasionally be assumed herein to be a smart card, and the data device readers 112 and 121 would in such a case be assumed to be smart card readers, as further described herein. Alternative data storage and retrieval units used instead of smart cards preferably have built-in intelligence in the form of programmable microprocessor circuitry or the equivalent, to carry out the security and other features described elsewhere herein.

Prior to using a gaming device, the player first obtains gaming credit on the portable data device (e.g., smart card) 130 by providing the portable data device 130 to the cashier station 120. Typically, this might be done by the player handing the portable data device 130 to a cashier (an employee of the casino or gaming establishment), who would be responsible for inserting the portable data device 130 in the data device reader 121 (which, if the portable data device 130 is a smart card, would take the form of a smart card reader). The cashier would then issue gaming credit to the portable data device 130, and collect an appropriate cash or payment from the player. In a typical embodiment of the cashier station 120, the cashier is presented with a screen interface (not shown), and can select among a number of options, one of which is adding gaming credit to the current portable data device 130. The cashier station 120 is preferably configured with a keyboard, keypad or other data input device (not shown), so as to allow the cashier to select the desired amount of gaming credit to add to the portable data device 130. When the player is finished gaming and wants to redeem (i.e., "cash out"), the data device reader 121 may read the amount of credit left on the portable data device 130, and display the amount of credit left on the screen for the cashier to read. The cashier may then select an option of deleting the remaining gaming credit on the portable data device 130, and may disburse cash or other form of payment to the player. In some embodiments, the portable data device 130 may have a programmed "retain value" which cannot be used for gaming, but is redeemable at the cashier station 120 to encourage the player to return the portable data device 130 when all of the available credit has been exhausted.

In addition to storing gaming credit, each portable data device 130 also preferably includes a player identification code, which allows the card to be correlated to a particular individual or entity. The player identification code is used for accounting purposes when information about particular gaming sessions is extracted from the gaming devices 110.

FIG. 15 is a diagram of a portable data device as may be used in the system shown in FIG. 1 or the various other embodiments herein, illustrating the information storage format for the portable data device. As shown in FIG. 15, a portable data device 1500 (which may, for example, comprise a smart card) comprises an identify file 1505 which stores identification and other information concerning the player and issuing gaming establishment, a keys file 1510 containing the secret keys for performing authentication checks, a transaction log file 1515 for storing data from the last gaming transactions (e.g., last 40 transactions), and a session log file 1520 storing data from the last gaming sessions (e.g., last 40 sessions).

Once gaming credit has been placed on a portable data device 130, the player may take the portable data device 130 to any of the gaming devices 110 and utilize them in a manner generally similar to coin-operated gaming devices, but only requiring a single simple act on the part of the player to obtain gaming credit on the gaming device 110. The player inserts the portable data device 130 into the intelligent data device reader 112, which communicates with the portable data device 130 over a communication link, such as is conventionally done with smart cards and smart card readers. According to well known communication protocols used with smart cards and smart card readers, data may be transmitted from the portable data device 130 to the data device reader 112 over the communication link (either with physical electrical contacts or an RF connection), and may likewise be transmitted from the data device reader 112 to the portable data device 130 over the communication link.

When the player inserts the portable data device 130 into the intelligent data device reader 112, the gaming device 110 validates the portable data device using a security module 113. If the portable data device 130 comprises a smart card, then the intelligent data device reader 112 preferably takes the form of an "intelligent" smart card reader, as further described herein. In a preferred embodiment, details of which are provided later herein, the intelligent data device reader 112 and security module 113 perform a cross-authentication check at the start of each new gaming session, and periodically during each gaming session. In such an embodiment, a gaming session is not enabled unless the cross-authentication check is passed without error.

In a preferred embodiment, the intelligent data device reader 112 and the security module 113 are uniquely associated with one another, such that the intelligent data device reader 112 will only operate with the security module 113 uniquely associated with it, and the security module 113 will only allow authentication of the intelligent data device reader 112 uniquely associated with it. Thus, an intelligent data device reader 112 which has been removed from its gaming device 110 will not be operable because its attempt to cross-authenticate with the associated security module 113 will result in a failure. Similarly, an intelligent data device reader 112 that is removed from one gaming device 110 and inserted in a different gaming device 110 will not be operable, because its attempt to cross-authenticate with the proper security module 113 will lead to an error. The security module 113 is preferably fastened securely to the gaming device 110 so that its removal is made as difficult as possible. For example, the security module 113 may take the form of an integrated circuit (i.e., chip) on a small printed circuit board, attached to the interior housing of the gaming device 110 by cabling passing through the printed circuit board, or by any other suitable means. Alternatively, the security module 113 may be integrated with the same electronic circuitry as the game device processor 114. In such a case, the random number generator used by the gaming device may also be incorporated within the security module 113, to prevent gaming from occurring without proper authentication. Placing the random number generator within the security module 113 also provides the capability of generating an electronic signature that allows verification of the authenticity of a jackpot (whether the gaming device 110 is in cash mode or cashless mode).

In addition to performing a cross-authentication check, the gaming device 110 also runs a validation test to ensure that the inserted portable data device 130 has been issued by an authorized casino or gaming establishment.

If the cross-authentication check passes, and if the portable data device 130 is determined to be valid, the gaming session is allowed to take place. The intelligent data device reader 112 reads the gaming credit on the card, and transfers part of the gaming credit to the game device processor 114. The security module 113 acts as a pass-through channel, allowing the intelligent data device reader 112 and the game device processor 114 to communicate freely, so long as the periodic cross-authentication checks are passed without error. The intelligent data device reader 112 stores gaming session information, such as the amount of gaming credit transferred in for the particular session, the amount played for the session, the amount won for the session, and the amount paid out for the session. The intelligent data device reader 112 stores the player identification code along with the gaming session information. A preferred set of information stored by the intelligent data device reader 112 is described hereafter in relation to FIGS. 8A–8E.

Each player can, using a single portable data device 130, play as many of the gaming devices 110 as desired, so long as the portable data device 130 has gaming credit available. Likewise, each gaming device 110 is capable of accepting portable data devices 130 from as many players as desire to play the gaming device 110. For each player, the gaming device 110 stores information pertaining to the player's gaming session.

Figure 9:
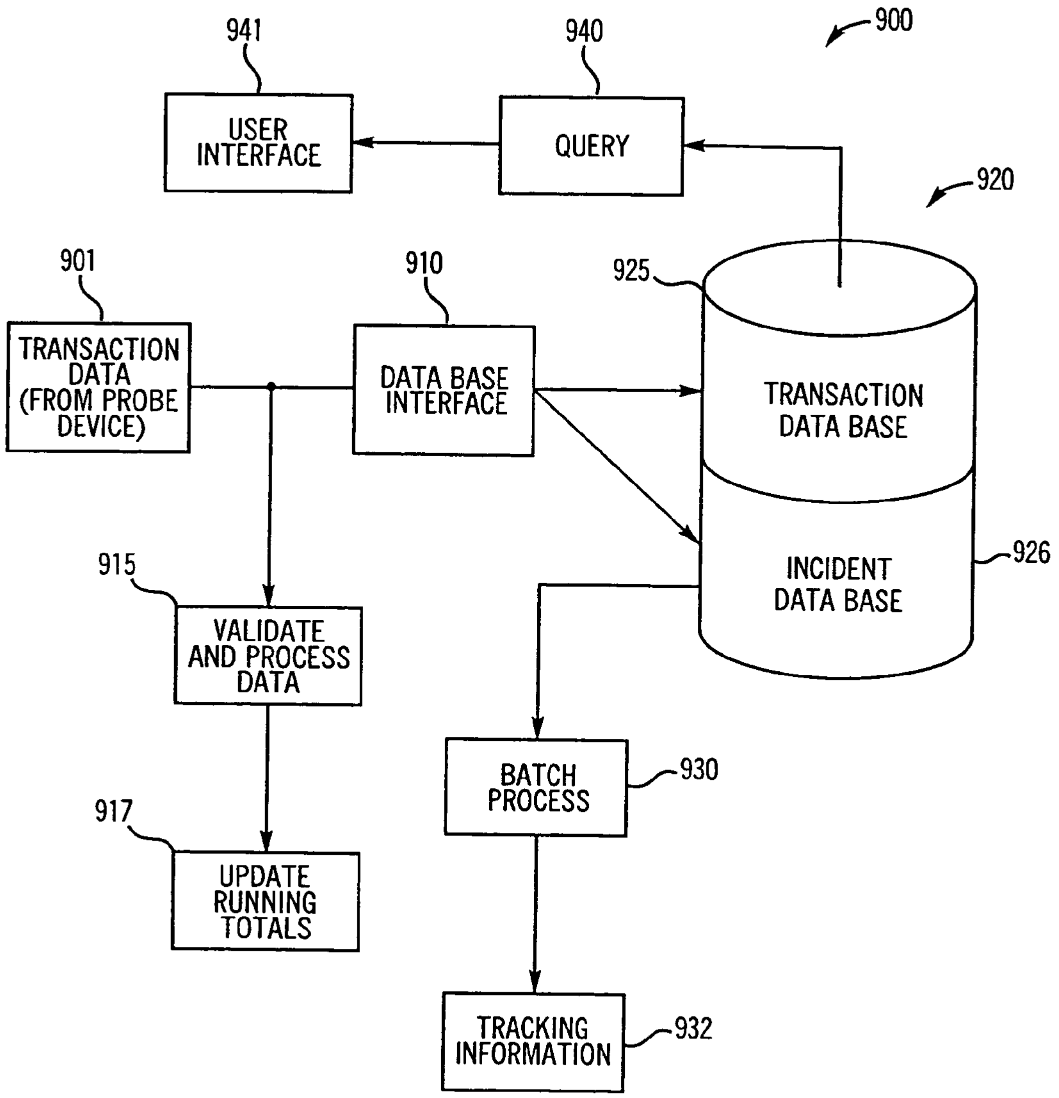
FIG. 9 is a block diagram illustrating processing of transaction data extracted from a data device reader.

At periodic intervals, which may be once each day or once every set number of days (primarily dependent upon the level of usage of the gaming devices 110), the gaming session information stored in the intelligent data device readers 112 of the various gaming devices 110 is extracted and delivered to a central accounting and processing system (an example of which is shown in FIG. 9 and discussed later herein). In a preferred embodiment, a data extraction device 140 is utilized to collect the gaming session information stored in the intelligent data device readers 112 of the various gaming devices 110. The data extraction device 140 preferably comprises a probe 141 connected to a portable high-volume memory storage device 142, which may simply be a laptop, personal computer, or a custom piece of equipment. The probe 141 is constructed in the size and shape of a smart card, and is configured with a smart card interface, including circuitry for communicating over the communication link between the probe 141 and the intelligent data device reader 112. When the probe 141 is inserted into the intelligent data device reader 112, the same type of validation and cross-authentication checks as described with reference to the portable data device 130 may, if desired, be carried out to ensure that the probe 141 is associated with an authorized data extraction device 140, and to ensure that the data device reader 112 is associated with the proper security module 113.

Once the validation and cross-authentication checks, if any, are carried out, a user of the data extraction device 140 may, using predefined buttons, a keypad, or user interface of any sort, instruct the intelligent data device reader 112 to transfer the collected gaming session data to the data extraction device 140. In response to such an instruction, the intelligent data device reader 112 downloads its collected gaming session information, and possibly other information (such as the number of incidents or mishaps), across the communication link to the data extraction device 140, via the probe 141. The type of data that may be transferred is described in more detail later herein with reference to FIGS. 7 and 8A–8E. Among other things, the data extraction device 140 obtains gaming session information for each player that has played the gaming device 110 since the last time the data was extracted from the gaming device.

The operator of the casino or gaming establishment proceeds in a similar manner with the relevant gaming devices 110, collecting gaming session information en masse from all of the gaming devices 110 which are a part of the secure cashless gaming system 100. After gaming session data is read out from a particular gaming device 110, the gaming session memory for the intelligent data device reader 112 may be cleared, or, alternatively, the gaming session memory may be re-circulated, with new gaming session information as it comes in overwriting the oldest gaming session information. In the latter case, should the extracted gaming session information be lost for whatever reason, it can be reconstructed by re-reading the data preserved in the gaming session memory of the intelligent data device reader 112.

Once the aggregate gaming session information has been obtained from the various gaming devices 110, the data extraction device 140 may be connected to a central accounting and processing database (e.g., database 123), through, for example, a physical cable connection to a data port 124 located at the cashier station 120 or elsewhere at the host system. Alternatively, the gaming session data may be transposed from the data extraction device 140 to a portable, permanent storage medium (such as a floppy disk), and then transferred to the central accounting and processing system through a reader (e.g., disk drive) of the permanent storage medium. In such a manner, the aggregate gaming session data is provided to the central accounting and processing system.

Once the aggregate gaming session data is provided to the central accounting and processing system, data for individual players and individual portable data devices (e.g., smart cards) are accumulated and processed. The current amount remaining on each of the portable data devices 130 can be determined, as of the date and time of the last extraction of gaming session data by the data extraction unit 140. Also, reconciliation for each of the gaming devices 110 can be accomplished. If desired, various data concerning individual player gaming habits can be collected and processed, for use by the casino or gaming establishment to track individual play and to allow the casino or gaming establishment to improve its targeted marketing efforts to the type of players it seeks to attract.

Figure 2:
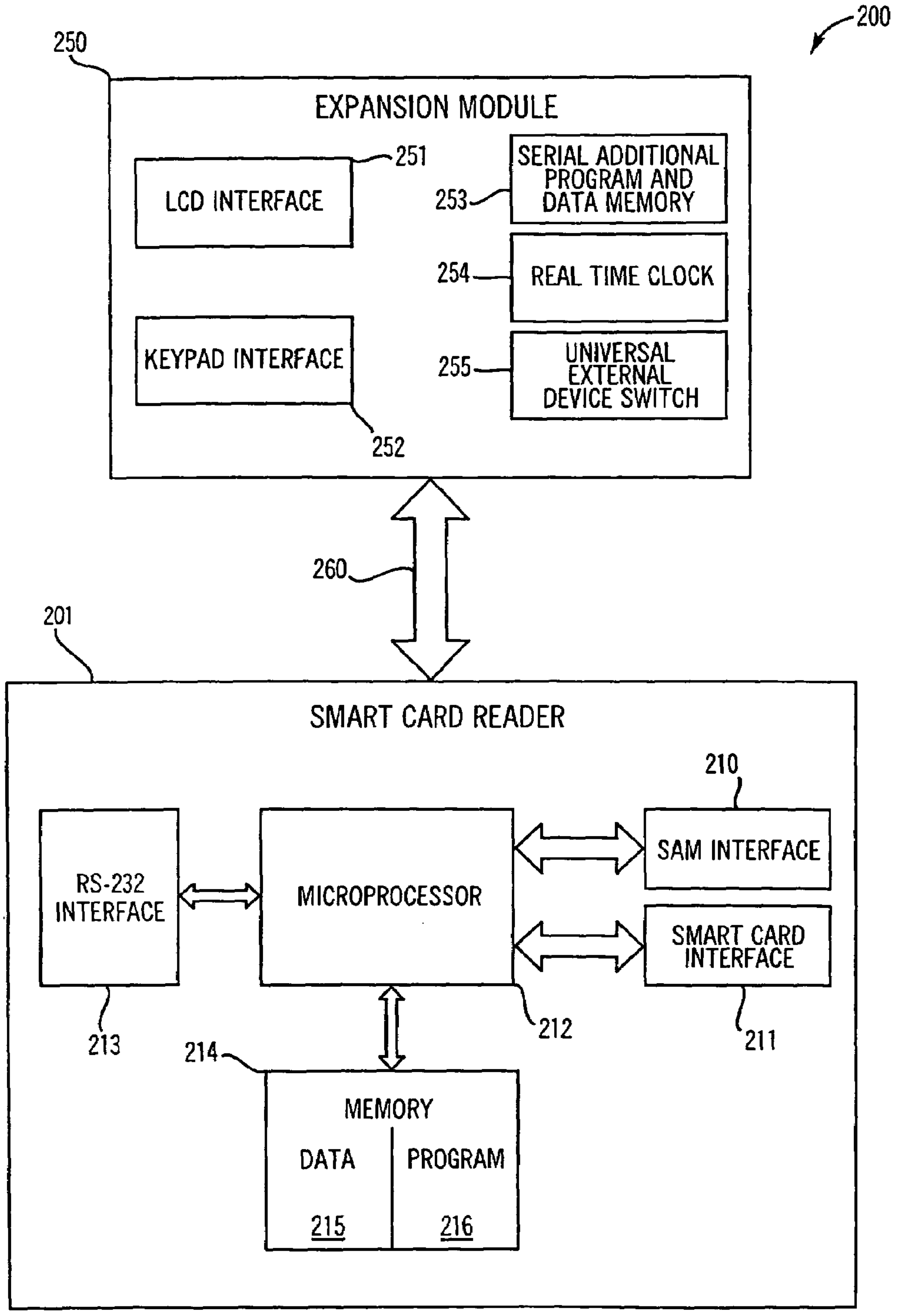
FIG. 2 is a block diagram of an intelligent data device reader as may be used in the secure cashless gaming system shown in FIG. 1.

FIG. 2 is a block diagram of one embodiment of an intelligent data device reader 200 as may be used in the secure cashless gaming system shown in FIG. 1 (for example, as intelligent data device reader 112). The intelligent data device reader 200 is particularly geared for use in reading smart cards, but can be adapted with different interfaces to other types of portable data devices as well. As illustrated in FIG. 2, the intelligent data device reader 200 comprises a smart card reader 201 and a expansion module 250 which allows various interface functionality. The smart card reader 201 comprises a smart card interface 211, which is capable of reading information from and transmitting information to smart cards inserted therein over a standard smart card communication link. The smart card interface 211 is connected to a microprocessor 212, which in turn is connected to a memory 214 (divided into data memory 215 and program memory 216), a serial interface (such as an RS-232 interface) 213, and a security and authentication module (SAM) 210 and associated interface. The memory 214 preferably comprises a combination of random-access memory (RAM) and electrically erasable programmable read-only memory (EEPROM), and programming code (or part of the total programming code) may be downloaded to the memory 214 in order to program the intelligent data device card reader 200. The expansion module 250 is connected to the smart card reader 201, and comprises a liquid crystal display (LCD) interface 251, a keypad interface 252, additional (external) program and data memory 253, a real time clock 254, and a universal external device switch 255.

In operation, data received from a smart card via the smart card interface 211 may be stored in local memory 214, or else may be communicated across the serial interface 213 to the security module 113 and/or the gaming device processor 114 (see FIG. 1). Similarly, data received over the serial interface 213 may be stored by microprocessor 212 in the local memory 214, or else may be communicated via the smart card interface 211 to an inserted smart card. Gaming session data 215 may be stored in the data memory 215, and/or in the external program and data memory 253, and may be read out to a data extraction device 140 (see FIG. 1) via the smart card interface 211 when the microprocessor 212 receives the appropriate commands.

The intelligent data device reader 200 may keep track of date and time information relating to gaming session data, and may use the real time clock 254 in expansion module 250 for obtaining accurate date and time information. The microprocessor 212 of the smart card reader 201 may be programmed to display pertinent information on the LCD interface 251, such as gaming credits currently remaining on the inserted smart card, the player's name, or any other desired information. The intelligent data device reader 200 may read a language field from the portable data device 130 in order to learn the preferred language of the player, and select the language of the information displayed on the LCD interface 251 accordingly. The keypad interface 252 of the expansion module 250 provides the ability for the player to manually select an amount to wager, to enter a personal identification number (PIN) to utilize the portable data device 130 (in a manner similar to a bank or credit card), or to otherwise communicate with the gaming device 110. It can also be used by gaming establishment personnel for maintenance, such as entering test data. The universal external device switch 255 of the expansion module 250 may comprise an electrical switch which can be used to allow the microprocessor 212 of the smart card reader 201 to activate an audible buzzer, beeper, LED, light, or the like.

Figure 14:
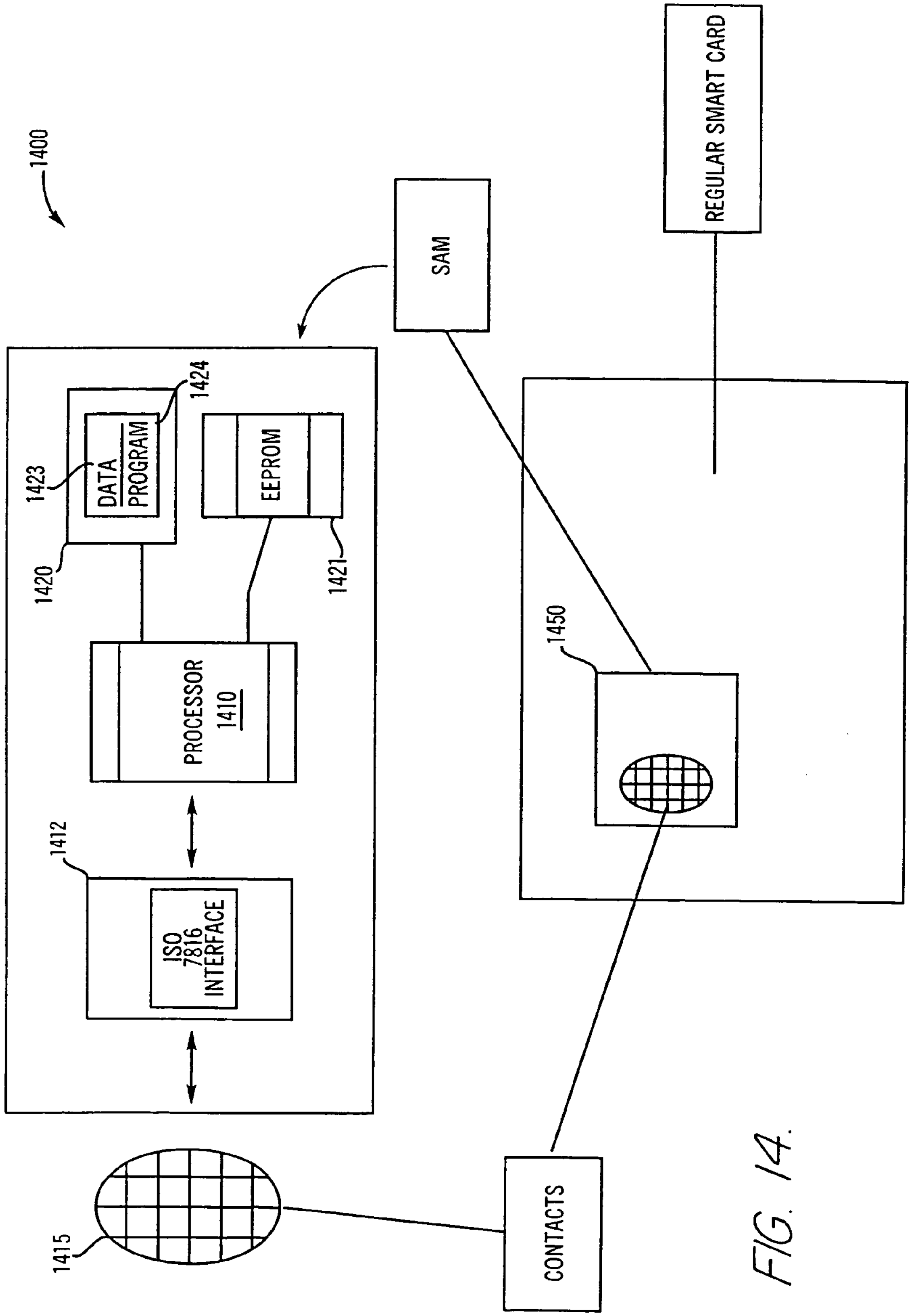
FIG. 14 is a block diagram of a preferred security and authentication module usable in various embodiments of an intelligent data device reader.

A block diagram of a preferred security and authentication module (SAM) 1400 usable in various embodiments of the intelligent data device reader 200 is shown in FIG. 14. The security and authentication module 1400 may physically comprise a smart card core (i.e., smart card electronics) 1450, and is preferably constructed to be a completely integral component encased in a secure housing (like an integrated chip), so that its internal connections are not externally accessible. As illustrated in FIG. 14, the security and authentication module 1400 comprises external contacts 1415 which are connected to a processor 1410 via an interface manager 1412 (preferably configured so as to be compatible with ISO 7816 interface standards). The processor 1410 is connected to a memory 1420, which is divided into data memory 1423 and program memory 1424. The processor is also preferably connected to a electrically erasable programmable read-only memory (EEPROM) 1421, or other form of non-volatile, erasable memory, for storing programming code or data that may need to be kept even if power is removed from the gaming device.

The EEPROM 1421 within the SAM 1020 may be used to store various cashless meters (in the form of program variables). Once stored, the cashless meters cannot be changed or cleared without proper access to the security and authentication module 1400 (generally requiring a master card giving the holder such privileges), even if power is removed from the gaming device. The cashless meters may be maintained by the SAM 1400 in addition to the cash meters which are typically maintained by the game device itself, and the provision of separate cashless and cash meter allows easier and more convenient accounting for the gaming device after the meters are read out. Preferably, both the cashless meters and cash meters may be read out using the portable data extraction device 140, which is described elsewhere in more detail herein.

Figure 3:
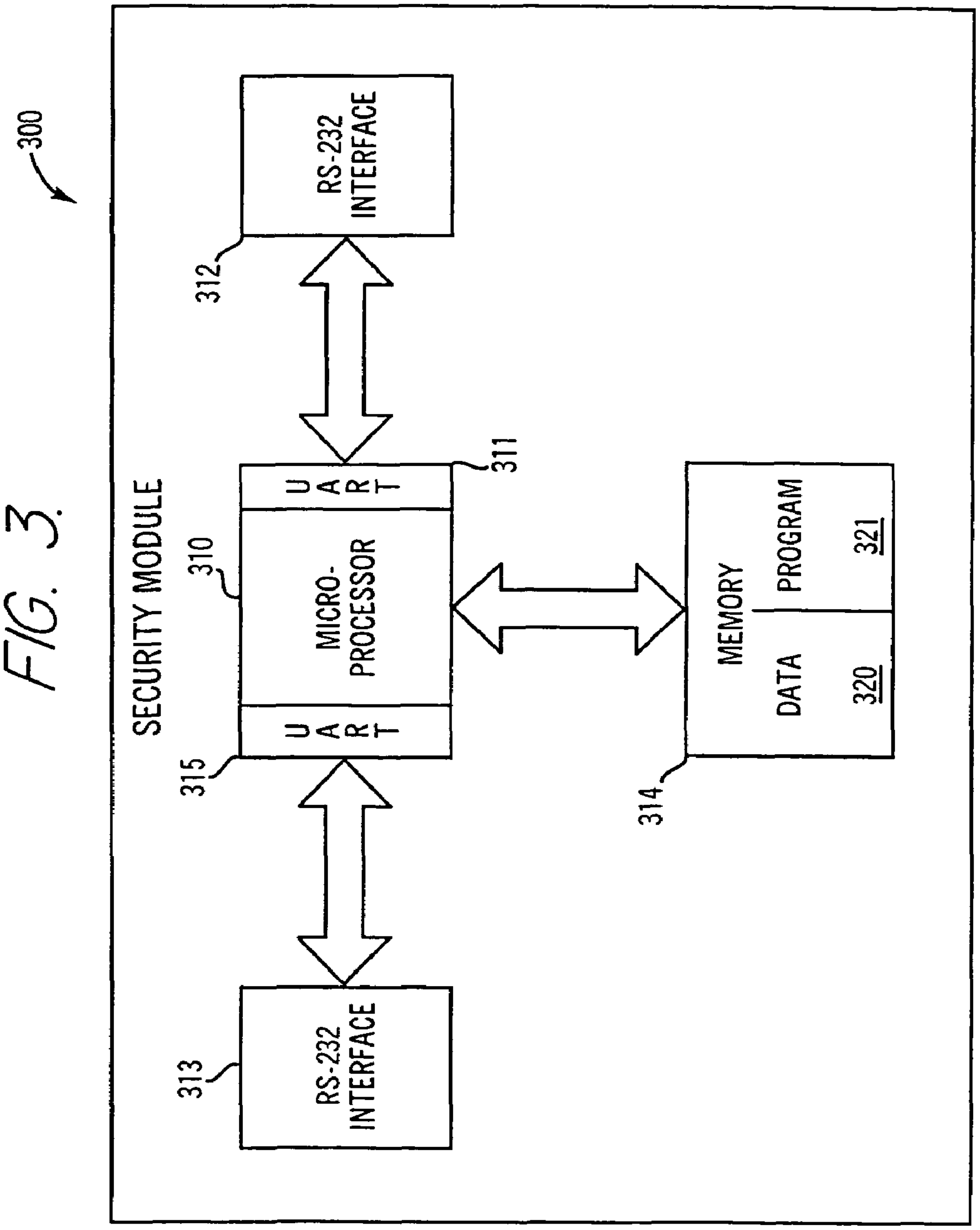
FIG. 3 is a block diagram of a security module as may be used in the secure cashless gaming system shown in FIG. 1.

As explained in connection with the secure cashless gaming system 100 of FIG. 1, the intelligent data device reader 200 may interface with a security module (such as security module 113 shown in FIG. 1), a preferred embodiment of which is illustrated in FIG. 3. As shown in FIG. 3, a security module 300 comprises a first interface 313 (such as an RS-232 serial communication port), which is connected to the intelligent data device reader 200 (or 112), a microprocessor 310, a memory 314 (which is divided into data memory 320 and program memory 321), and a second communication interface 312 (such as an RS-232 serial communication port), which is connected to the game device processor. Two communication port managers 311, 315 (each of which may take the form of a universal asynchronous transceiver/receiver (UART)) are resident with the microprocessor 310, for handling communications over the communication interfaces 312 and 313, respectively. Alternatively, the communication port managers (e.g., UARTs) 311, 315 may be located off-chip from the microprocessor 310.

In a preferred embodiment, the microprocessor 310 of the security module 300 is programmed to, among other things, perform one side of the cross-authentication check when a gaming session starts, and periodically thereafter. Programming instructions for its part of the cross-authentication check are stored in program memory 321. Likewise, programming instructions for the counterpart of the cross-authentication check conducted by the intelligent data device reader 200 are stored in the program memory 216 of the smart card reader 201.

Figure 16:
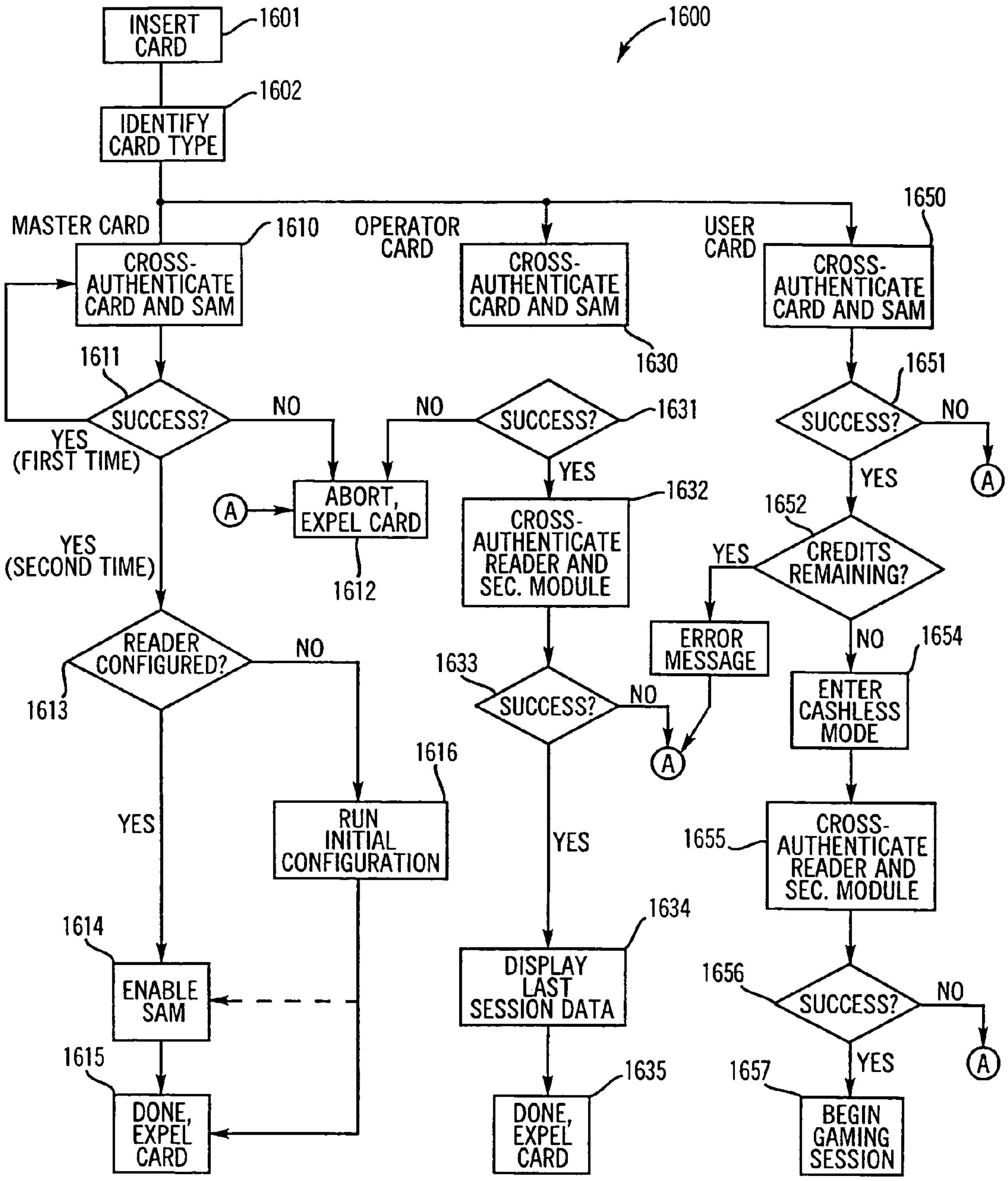
FIG. 16 is a flow chart diagram illustrating from a global perspective the operation of a gaming system in accordance with a preferred embodiment as described herein.

FIG. 16 is a flow chart diagram illustrating the operation of a gaming system in accordance with a preferred embodiment as described herein. The flow chart diagram of FIG. 16 will be described in relation to the gaming system 110 illustrated in FIG. 1 and the preferred intelligent data device reader 200 illustrated in FIG. 2, but many of its principles may be applied to other embodiments, including on-line embodiments, as well. Further, for purposes of illustration, the portable data device 130 will be assumed to be a card (e.g., smart card), although other types of portable data devices could also be used.

As illustrated in FIG. 16, in a first step 1601 of the operation of the gaming system, a card is inserted into the intelligent data device reader 112. In a preferred embodiment of the gaming system, the card may be one of several types. The card may be, for example, a user card, a master card, or an operator card. In a next step 1602, the intelligent data device reader 112 identifies the type of card. This identification process may be accomplished by reading the response from the data device interface (e.g., smart card reader 211 shown in FIG. 2); for example, the "answer to reset" or "ATR" returned by a smart card reader. Besides being a user, master or operator card, the input could also be a probe 141 from a data extraction unit 140, in which case gaming session data may be read out, with or without authentication as described elsewhere herein.

If the input is identified as a master card, then the process moves to step 1610, wherein the card is cross-authenticated with the intelligent data device reader 112 and, more specifically, with the security and authentication module (SAM) 210 (shown in FIG. 2). For the cross-authentication referred to in step 1610, the microprocessor 212 of the smart card reader 201 acts as an intermediary between the processor located on the master card and the processor (such as processor 1410 shown in FIG. 14) located on the SAM 210. A first common key is used for this cross-authentication check, which may be carried out, for example, in accordance with the same general techniques described hereinafter with respect to FIG. 4. If the cross-authentication check fails, then, moving to step 1612, the process is aborted and the card is expelled. The cross-authentication check may be done multiple times (twice, in the example shown) to increase security.

If the cross-authentication check succeeds, the process then moves to step 1613, wherein the master card checks whether the gaming device 110 has been initialized and, specifically, whether the intelligent data device reader 112 has been initially configured. If not, then an initial configuration is run in step 1616, whereby the intelligent data device reader 112 is "matched" to the security module 113 by downloading the unique security module identifier to the SAM 200, which may be done using the portable data extractor 140 in its programming capacity. Once the SAM 200 has been loaded with the unique security module identifier, the SAM 200 and security module 113 jointly build a second common key for subsequent use in later authentication checks, and the intelligent data device reader 112 thereby becomes uniquely associated with the particular security module 113 for the gaming device 110. If the intelligent data device reader 112 has not been initially configured, then there is no way for a player with a user card to attempt to cross-authenticate with the security module 113, and no way for the player to utilize the gaming device 110.

Once the intelligent data device reader 112 has been initially configured and associated with the security module 113, the SAM 200 may be enabled using the master card. The SAM 200 preferably is programmed so that it needs to be re-enabled by the master card whenever the gaming device 110 is reset or power is removed from the gaming device 110.

If the inserted card is an operator card, then the process moves to step 1630, wherein the card and SAM 200 carry out a cross-authentication as described above for the master card. Alternatively, one-way authentication of the operator card (but not the SAM 200) may be performed. If the cross-authentication or one-way authentication check not successful, the process aborts and the card is expelled. Otherwise, the intelligent data device reader 112 may perform a second cross-authentication, this time with the security module 113 itself (although this step 1632 may be skipped, if desired, since the operator card generally does not attempt to communicate with the game device processor). In particular, the second cross-authentication, if done, may be carried out between the SAM 200 and the security module 113, using the second common key that is stored in the SAM 200 and in the security module 113 (and developed during initial configuration). The cross-authentication check may be carried out according to the process shown in FIG. 4 and described later herein. If not successful, the process aborts. Otherwise, the intelligent data device reader 112 displays gaming session data from the last several sessions. In one embodiment, for example, the intelligent data device reader 112 displays the total gaming session results from the last five sessions, as well as the most recent results from the last several gaming transactions associated with the most recent gaming session. The operator card can thereby be used by gaming establishment personnel on the floor to check wins, losses, jackpots and the like that have recently occurred at a machine. The gaming session data may be automatically scrolled through by the intelligent data device reader 112, or else, if a keypad or keyboard is provided, the operator may select which gaming session information to display. In addition to its other functions, the master card may also be provided with the same privileges as an operator card.

If the card inserted is a user card, then the process moves to step 1650, wherein cross-authentication between the card and the SAM 200 is carried out in a manner similar to that described for the master card. If not successful, the process aborts. Otherwise, the intelligent data device reader 112 queries the game device processor 114 to see whether any credits (i.e., coins or other cash input) remains on the game device 110. If so, then a message to that effect is displayed in step 1653, and the process aborts with the user card being expelled. Otherwise, the intelligent data device reader 112 instructs the game device processor 114 to enter a cashless mode, and refuse to accept cash until the end of the gaming session. Transferring between cash and cashless mode in gaming devices is conventionally done in on-line gaming devices, and is well known in the art. Once cashless mode is entered, in step 1655 a second cross-authentication is carried out, this time between the intelligent data device reader 112 and the security module 113. More particularly, the cross-authentication is carried out between the SAM 200 and the security module 113 using the second common key stored in the SAM 200 and the security module 113. The cross-authentication check may be carried out according to the process shown in FIG. 4 and described later herein. If the cross-authentication check fails, then the process aborts. Otherwise, in step 1657, a gaming session is allowed to begin.

Figure 18:
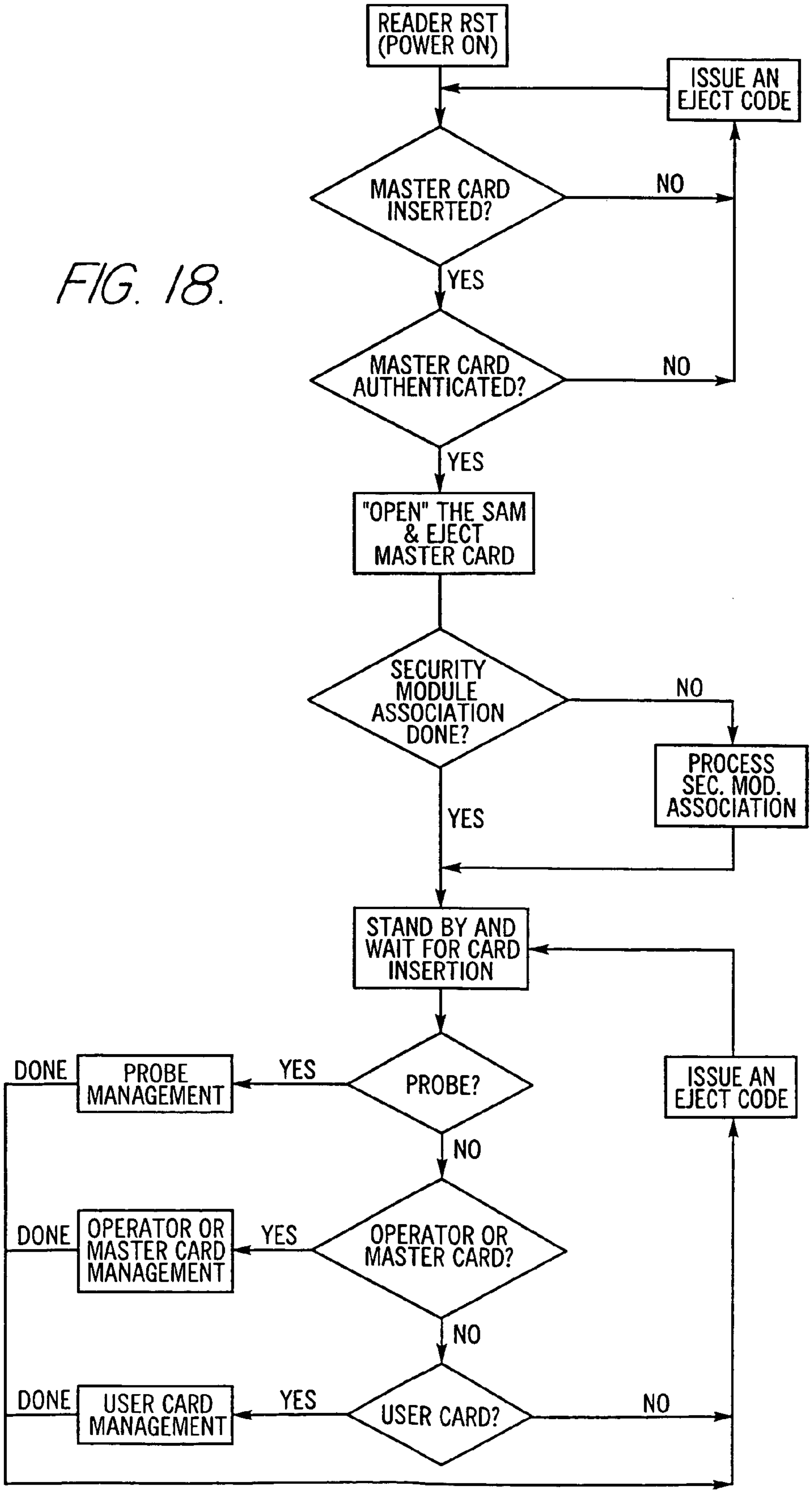
FIGS. 18–21 are additional flow chart diagrams illustrating the operation of a gaming system in accordance with an embodiment as described herein.

FIGS. 18–21 are additional flow chart diagrams illustrating the operation of a gaming system in accordance with a preferred embodiment as described herein, providing some additional details and some variation over the flow chart diagram of FIG. 16. FIG. 18 illustrates a top-level flow chart, wherein, similar to the flow chart diagram of FIG. 16, a master card is required to be inserted and authenticated, and association of the security module 113 accomplished. After association of the security module 113 and intelligent data device reader 112 is accomplished, the intelligent data device reader 112 awaits insertion of a portable data extraction unit 140, a user card, or an operator or master card.

Figure 19:
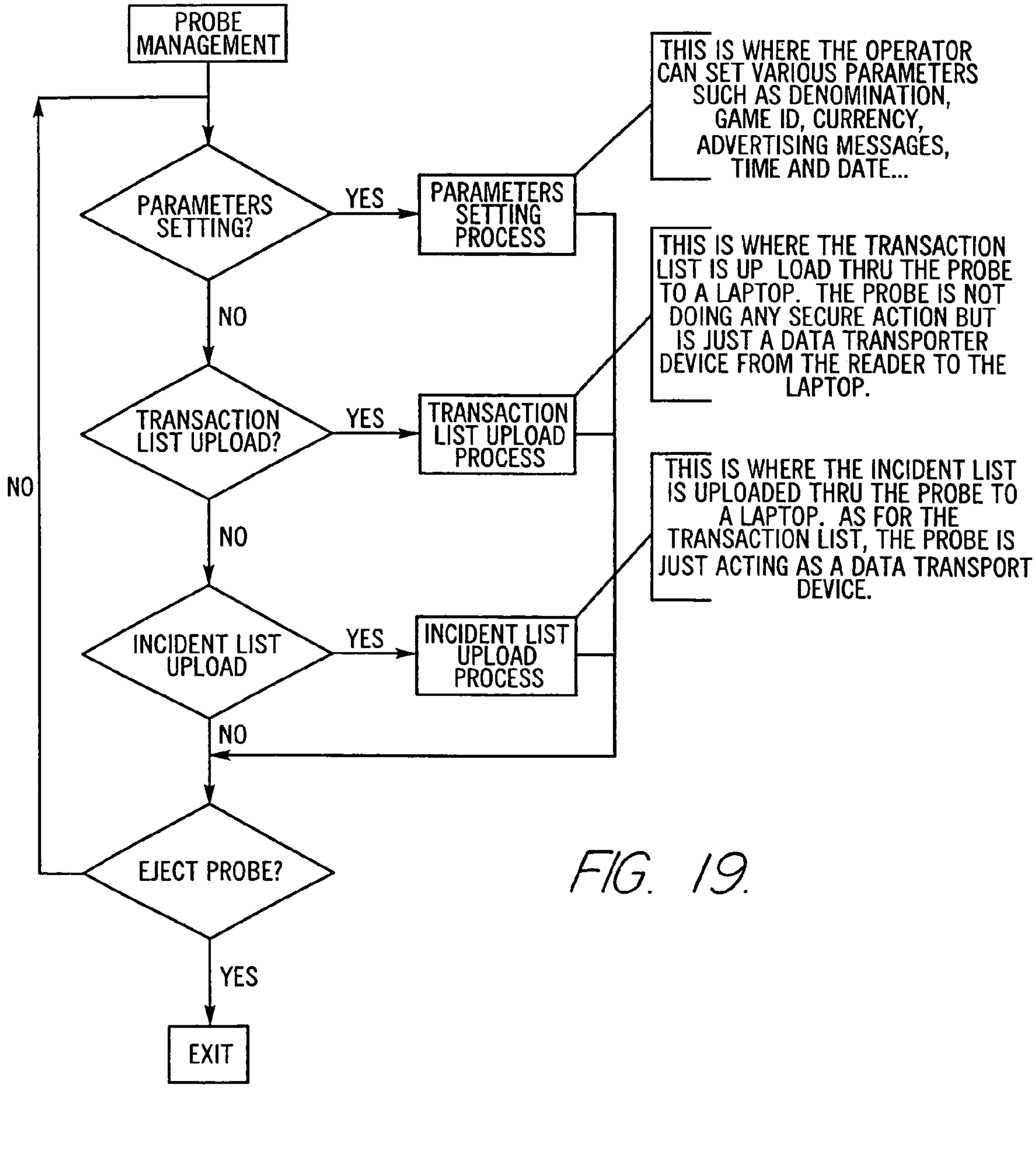
Figure 20:
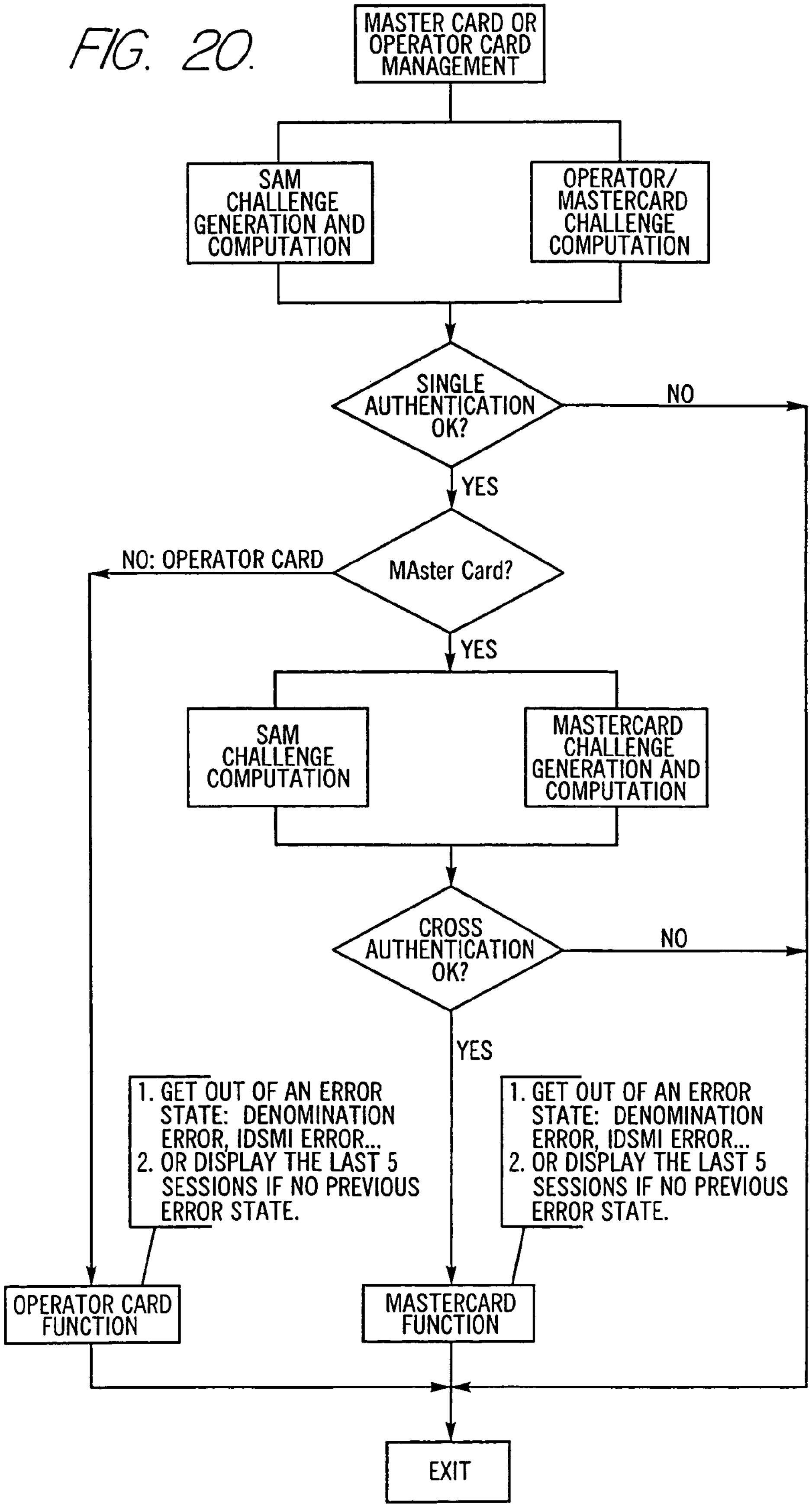
Figure 21:
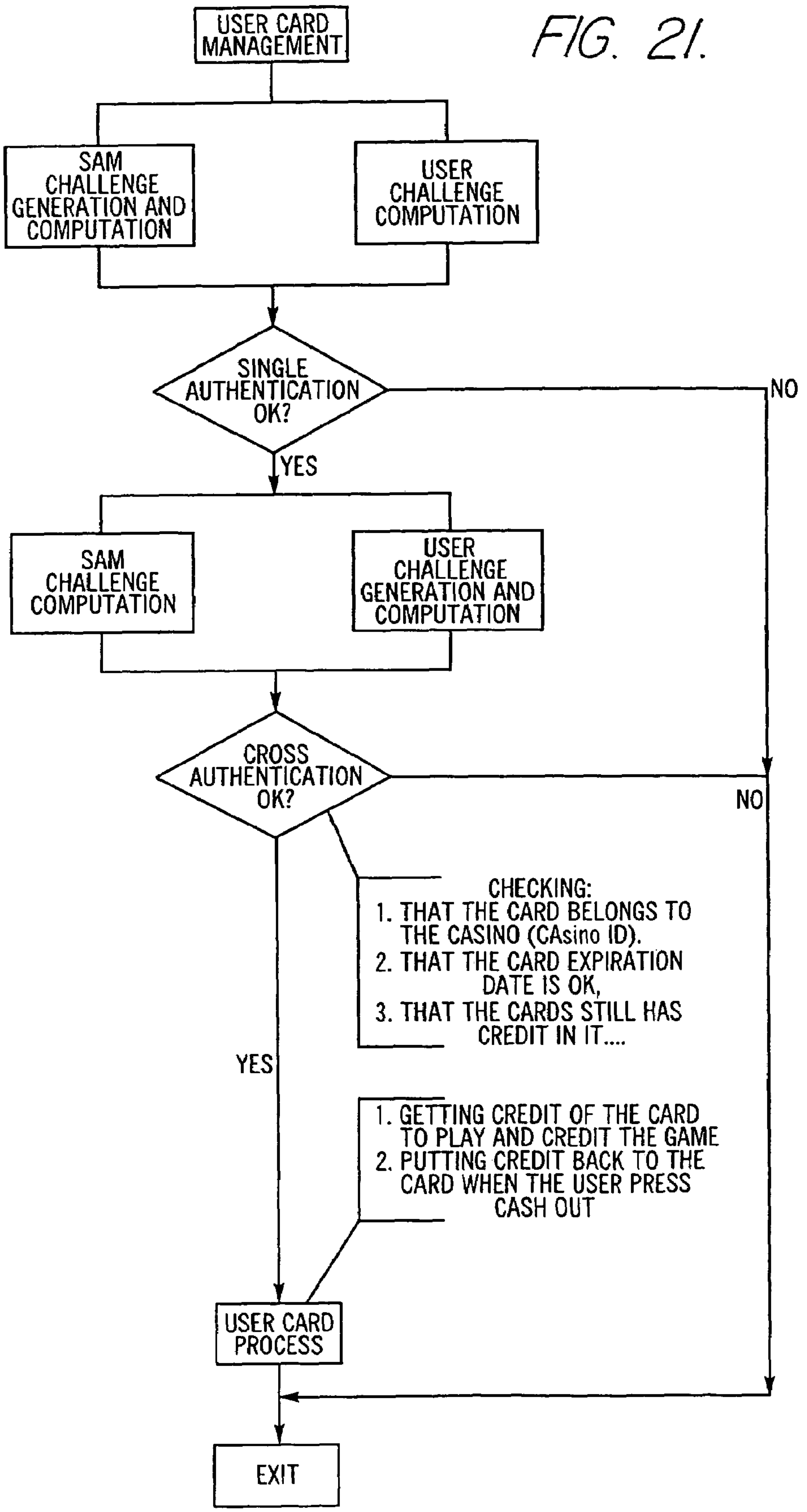

FIG. 19 illustrates a preferred process flow in the case that the probe 141 of the data extraction unit 140 is inserted into the intelligent data device reader 112. According to the process flow shown in FIG. 19, various options are provided to the operator, including the setting of parameters and uploading of various data, as described later herein. FIG. 20 illustrates a preferred process flow in the case that a master card is re-inserted or an operator card is inserted into the intelligent data device reader 112. As shown in FIG. 20, various authentication checks are performed prior to allowing application of the operator card or master card functionality. FIG. 21 illustrates a preferred process flow in the case that a user card is inserted into the intelligent data device reader 112. Again, various authentication checks are performed prior to allowing user card functionality to be applied.

Figure 4:
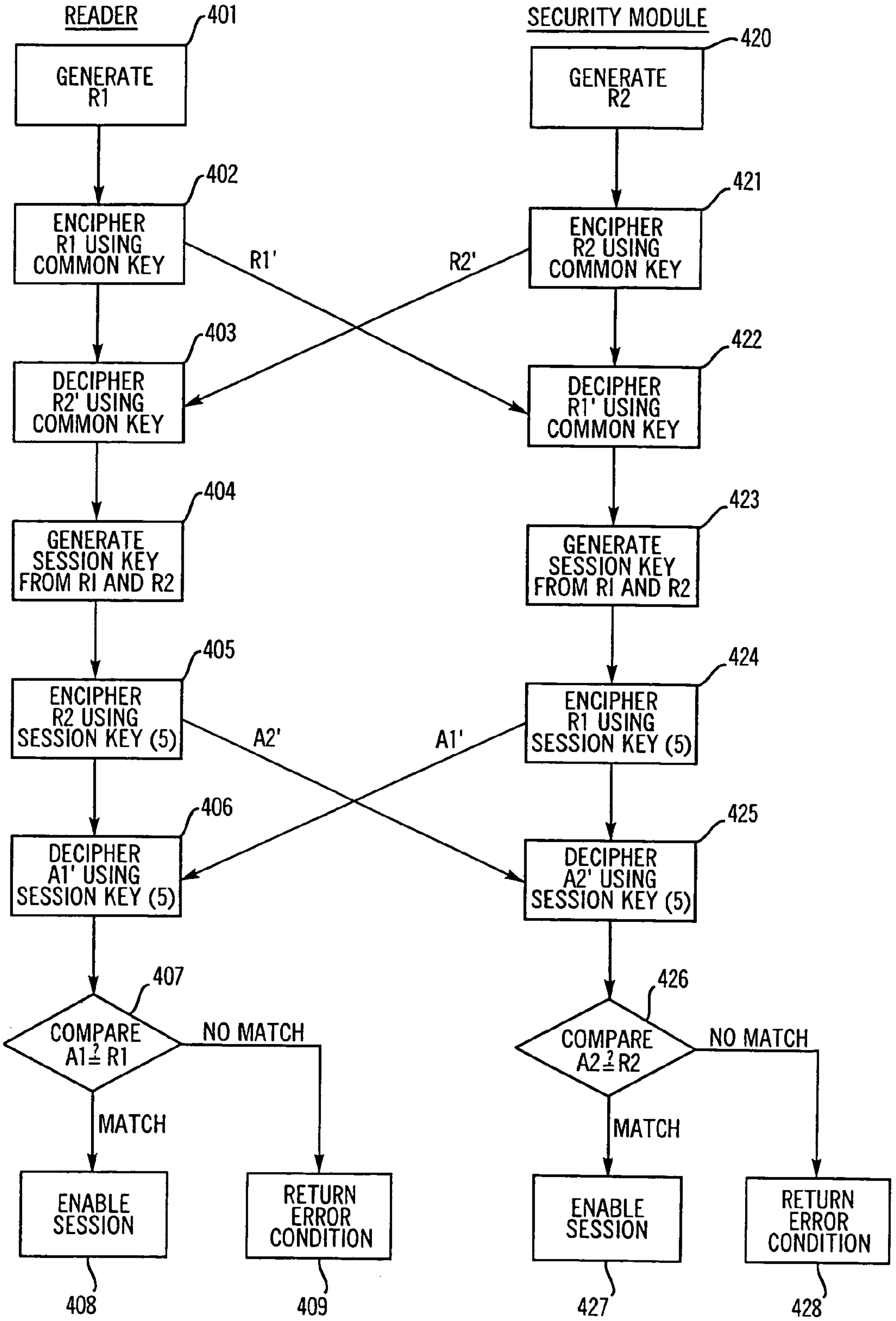
FIG. 4 is a process flow chart of a cross-authentication procedure as may be carried out between an intelligent data device reader and a security module of the secure cashless gaming system shown in FIG. 1.

FIG. 4 is a process flow chart of a preferred cross-authentication procedure as may be carried out between the intelligent data device reader (e.g., intelligent data device reader 200 shown in FIG. 2) and the security module (e.g., security module 300 shown in FIG. 3), or between the intelligent data device reader and portable data device (e.g., portable data device 1500 shown in FIG. 15). As illustrated in FIG. 4, in a first step 401, a random number R1 is generated by the intelligent data device reader 200. In a next step 402, the random number R1 is enciphered by the intelligent data device reader 200 using a common key (which may be stored in SAM interface 210), yielding enciphered random number R1'. Concurrently, in step 420, a random number R2 is generated by the security module 300, and in a following step 421, the random number R2 is enciphered by the security module 300 using the same common key, yielding enciphered random number R2'. The enciphered random numbers R1', R2' are then exchanged by the intelligent data device reader 200 and the security module 300. In step 403, the intelligent data device reader 200 deciphers enciphered random number R2' using the common key, thus obtaining the original random number R2, and generates a session key S from R1 and R2 in step 404. Likewise, in step 422, the security module 300 deciphers enciphered random number R1' using the common key, thus obtaining the original random number R1, and generates the same session key S from R1 and R2 in step 423, using the same algorithm to do so as the intelligent data device reader 200.

In step 405, after the session key S has been generated, random number R2 is enciphered by the intelligent data device reader 200 using the session key S, yielding an enciphered resultant A2'. Similarly, in step 424, random number R1 is enciphered by the security module 300 using the session key S, yielding an enciphered resultant A1'. The enciphered resultants A1' and A2' are exchanged by the intelligent data device reader 200 and the security module 300. In step 406, the intelligent data device reader 200 deciphers enciphered resultant A1' received from the security module 300, while in step 425 the security module 300 deciphers enciphered resultant A2' received from the intelligent data device reader 200. In step 407, the intelligent data device reader 200 compares the deciphered resultant R1 against its originally generated random number R1. If a match is found, then, in step 408, the gaming session is enabled, while if no match is found an error condition is returned in step 409. Similarly, in step 426, the security module 300 compares the deciphered resultant R2 against its originally generated random number R2. If a match is found, then, in step 427, the gaming session is enabled, while if no match is found an error condition is returned in step 428. The results of each part of the cross-authentication check may be shared between the intelligent data device reader 200 and the security module 300.

If either part of the cross-authentication check fails, then the security module 300 will not open up the communication pathway to the gaming device processor 114 (see FIG. 1), and the player will essentially be locked out from utilizing the gaming device 110. Similarly, if either part of the cross-authentication check fails, then the intelligent data device reader 200 is programmed to prevent communication with the gaming device processor 114 and to shut down its further communication with the portable data device 130. Thus, even if the security module 300 were physically bypassed (for example, by wires) after a gaming session had started, the periodic cross-check would determine that the security module 300 was no longer present, and the intelligent data device reader 200 would not allow the gaming session to continue.

Figure 5:
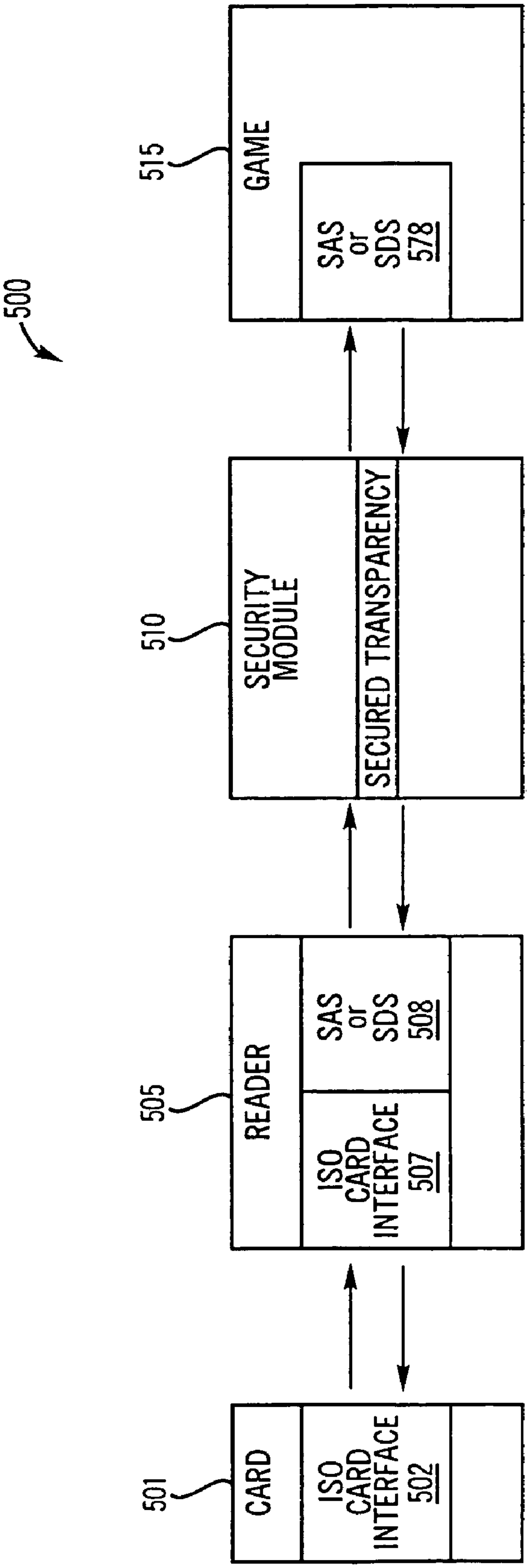
FIG. 5 is a conceptual diagram illustrating the different interfaces among some of the primary components for one embodiment in accordance with the secure cashless gaming system shown in FIG. 1.

FIG. 5 is a conceptual diagram illustrating the different interfaces among some of the primary components in a preferred secure cashless gaming system. As shown in FIG. 5, a smart card 501 is configured to communicate according to a standard (e.g., ISO) card interface protocol 502. An intelligent data device reader 505 is configured to communicate with the smart card 501 using the same standard (e.g., ISO) card interface protocol 507. The intelligent data device reader 505 is also configured to communicate with a security module 510 using a standard gaming device interface protocol 508, such as SAS or SDS, for example, both of which are conventional and well known in the field of gaming devices. The security module 510 is configured so as to allow pass-through communication (i.e., transparency), once the cross-authentication and validation checks have cleared. The intelligent data reader 505 thereby communicates with the gaming device processor 515, which is also configured to communicate using a standard gaming device interface protocol 518 (the same gaming device interface protocol 508 as used by the intelligent data device reader 505), such as SAS or SDS.

The interfaces illustrated in FIG. 5 may be utilized in the cashless gaming device system 100 shown in FIG. 1, or in connection with the specific intelligent data device reader 200 or security module 300 illustrated in FIGS. 2 and 3, respectively.

Figure 17:
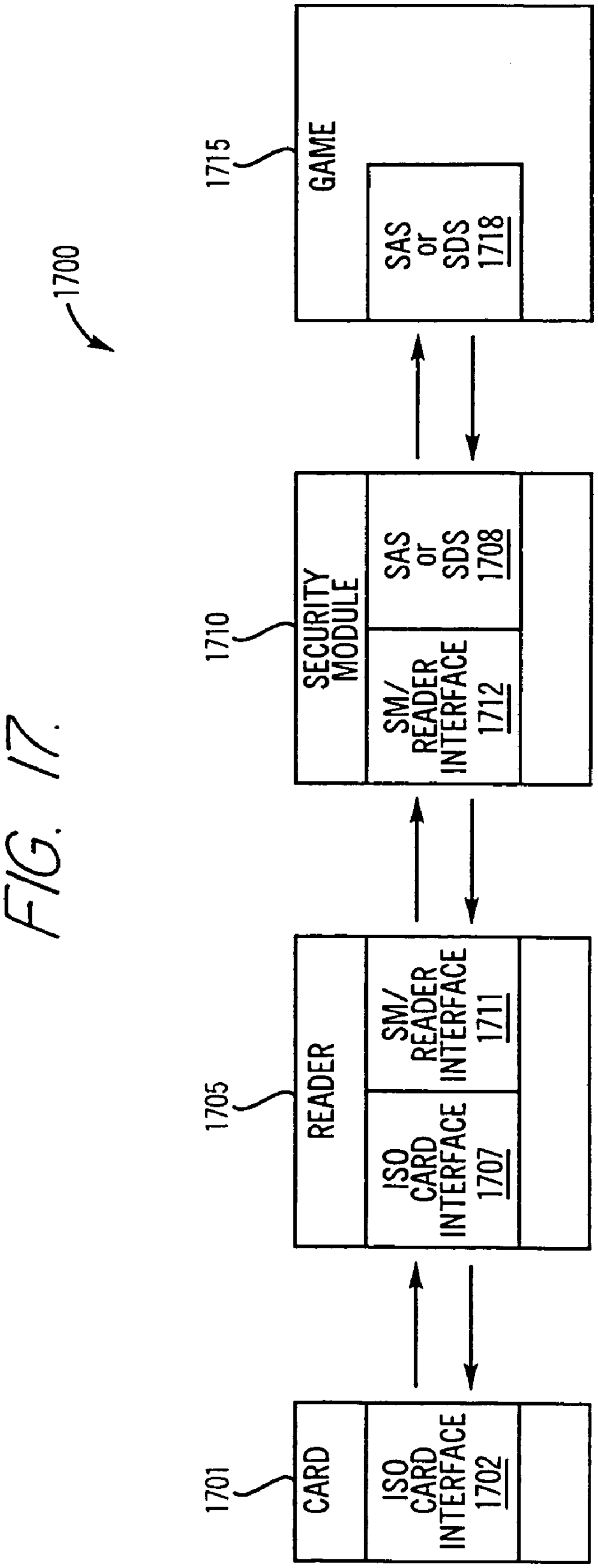
FIG. 17 is a conceptual diagram illustrating the different interfaces among some of the primary components for an alternative embodiment in accordance with the secure cashless gaming system shown in FIG. 1.

FIG. 17 is a conceptual diagram illustrating the different interfaces of some of the primary components of the secure cashless gaming system shown in FIG. 1, in accordance with an alternative embodiment as described herein. As illustrated in FIG. 17, similar to the embodiment shown in FIG. 5, a smart card 1701 is configured to communicate according to a standard (e.g., ISO) card interface protocol 1702. An intelligent data device reader 1705 is configured to communicate with the smart card 1701 using the same standard (e.g., ISO) card interface protocol 1707. The intelligent data device reader 1705 is also configured to communicate with a security module 1710 using a special protocol, designated as a security module (SM)/Reader interface protocol 1711 in FIG. 17. A security module 1710 also is configured to communicate with the intelligent data reader 1705 using the SM/Reader protocol 1712. The security module 1710 translates between the SM/Reader protocol 1712 and a standard gaming device interface protocol 1708, such as SAS or SDS. The security module 1710 is configured so as to communicate with the gaming device processor 1715, which is also configured to use the standard gaming device interface protocol 1718 (i.e., the same gaming device interface protocol 1708 as used by the security module 1710), such as SAS or SDS.

The SM/Reader interface protocol 1711, 1712 preferably supports at least of subset of commands and capabilities as provided by the standard gaming device interface protocol 1708 and 1718, but need not provide all of the capabilities thereof, particularly if the gaming device is used off-line. The SM/Reader interface protocol 1711, 1712 may, for example, support commands or capabilities for crediting the gaming device, debiting the gaming device, checking the denomination of the gaming device, checking the gaming device identification number, checking the currency of the gaming device, checking the amount of credit left on the gaming device, and receiving gaming device activity (such as, for example, how much the player is betting, result of gaming transaction (winner, loser, jackpot, etc.), or error conditions at the gaming device).

An advantage of the protocol structure illustrated in the embodiment of FIG. 17 is that the same intelligent data device reader 1705 could be used without modification along with gaming devices using any standard gaming device interface protocol that is supported by the security module 1710. For the protocol structure illustrated in FIG. 5, by contrast, it may be necessary to download the specific standard gaming device interface protocol 508 to the intelligent data device reader 505 prior to operation, unless the memory space of the intelligent data device reader 505 is sufficient to contain the various standard gaming device interface protocols from which the desired one may be selected. By moving the responsibility for interfacing with the standard gaming device interface protocol to the security module 1710, as illustrated in FIG. 17, the memory requirements for the intelligent data device reader 1705 may be alleviated somewhat.

As with the embodiment shown in FIG. 5, the interfaces illustrated in FIG. 17 may be utilized in the cashless gaming device system 100 shown in FIG. 1, or in connection with the specific intelligent data device reader 200 or security module 300 illustrated in FIGS. 2 and 3, respectively.

When the cross-authentication and validation checks first pass, and a gaming session is enabled, the intelligent data device reader 112 may be programmed with additional capability to start off a gaming session without extra effort by the player. Specifically, the intelligent data device reader 112 may be programmed to remove gaming credits from the credit amount stored in the portable data device 130, and to transfer those credits to the gaming device processor 114 to allow play to begin. The number of credits to be so transferred may be programmably set. The intelligent data device reader 112 uses an link layer protocol (such as a smart card protocol) for reading and adjusting the credits on the portable data device 130, then uses the gaming device protocol (such as SAS or SDS) to transfer the credits over to the gaming device processor 114. The monetary value and/or number of credits transferred (and hence available) may be displayed to the player on an LCD display, along with other information, as desired, such as the players name or pseudonym. The portable data device 130 may have a player language data field, which may be read by the intelligent data device reader 112, which can adjust the language of any special messages accordingly.

The intelligent data device reader 112 may further be programmed such that each time the number of available credits drops below a predefined level, the intelligent data device reader 112 transfers additional gaming credits from the current credit amount on the portable data device 130 to the gaming device processor 114. The intelligent data device reader 112 is aware of the number of current credits, as well as the outcome of the most recent gaming transaction, because the gaming device processor 114 is typically programmed to make such information available according to standard gaming device protocols (such as SAS or SDS). The level at which the intelligent data device reader 112 re-credits the gaming device 110, and the amount of credits transferred in a re-credit transaction, may both be programmably set. By automatically re-crediting the machine each time the number of credits drops below the predefined minimum, the player does not need access to a keypad or other similar means for transferring credits, and is not burdened with the inconvenience of constantly refreshing the amount of credits at the machine.

At the end of a gaming session, or periodically during the gaming session as gaming credits are transferred to the gaming device 110, the intelligent data reader 112 transmits back to the smart card (or other portable data device 130) update information which alters the amount of gaming credit remaining on the portable data device 130. When the player leaves the gaming device, the new gaming credit amount will reside on the portable data device 130. Preferably, the portable data device 130 stores a predefined number of previous gaming transactions (i.e., wagers), such as 10 or 20 previous gaming transactions. Generally, memory space on devices such as smart cards is very limited, which prevents storage of large amounts of information. Storage of a limited number of gaming transactions may prove beneficial in certain circumstances. For example, should the player contest a pay-out on a recent wager, the portable data device 130 could be read (at the cashier station 120) to determine what transpired at the gaming device 110.

Figure 6:
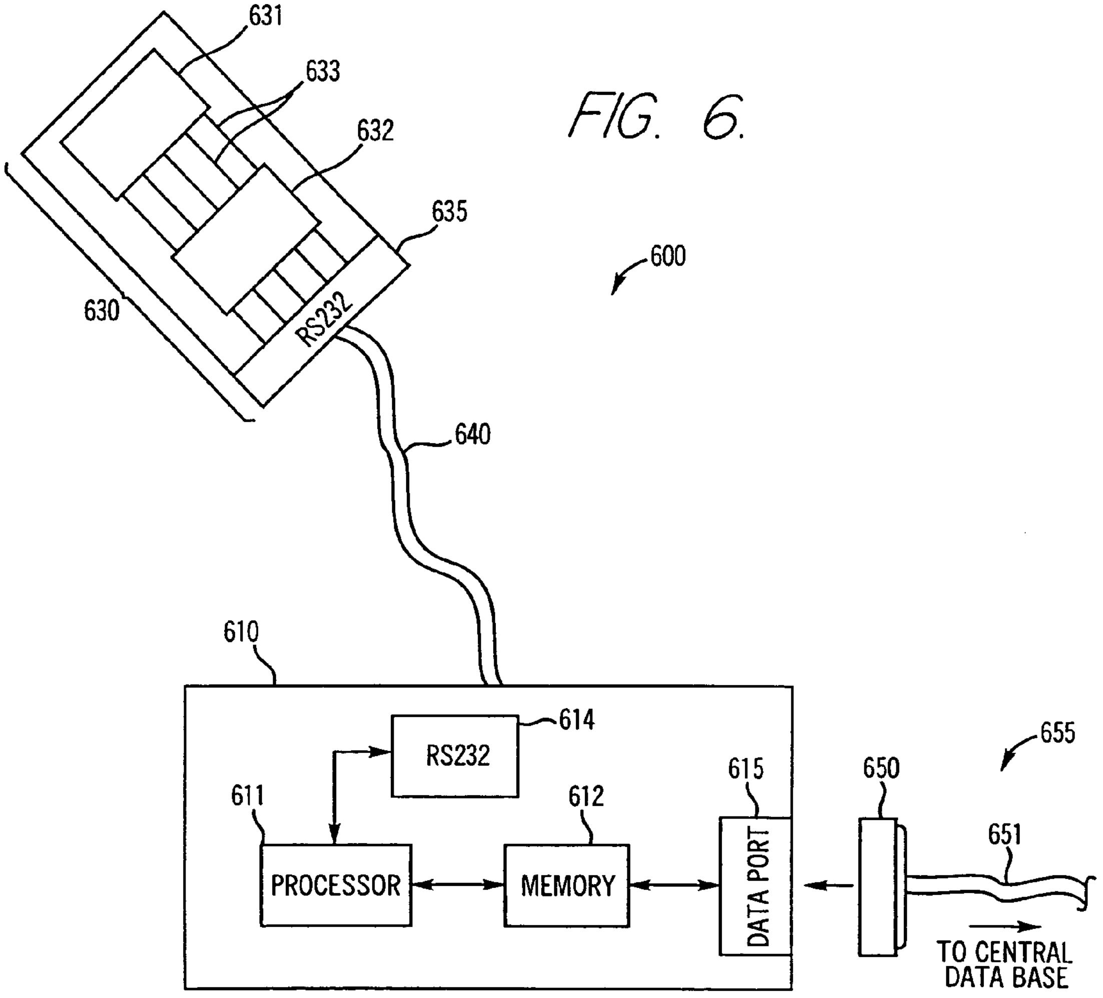
FIG. 6 is a diagram of a data extraction device such as may be used in the secure cashless gaming system shown in FIG. 1.

FIG. 6 is a diagram of a preferred data extraction device 600 such as may be used in the secure cashless gaming system shown in FIG. 1 (for example, as data extraction device 140 shown in FIG. 1). As illustrated in FIG. 6, the data extraction device 600 includes a probe 630 connected to a portable high-volume data retention unit 610 via a cable 640. The probe 630 consists of an interface 631 which is compatible with the interface utilized by the intelligent data device reader 112 (see FIG. 1). Signals received by the interface 631 from the intelligent data device reader 112 are amplified by a voltage converter interface 632, so as to make them of the appropriate voltage level for a serial (e.g., RS-232) interface 635. Typically, signals output by the interface 631 are 5-volt signals, while an RS-232 interface operates with 12-volt signals. The amplified signals are transmitted by the serial interface 635 over the cable 640 to another serial (e.g., RS-232) interface 614, which is part of the portable high-volume data retention unit 610. The portable high-volume data retention unit 610 also comprises a processor 611 and a memory 612 for receiving and storing information received by the probe 630 from the intelligent data device reader 112. Memory 612 is preferably of sufficient capacity so as to allow storage of gaming session information from a large number of gaming devices 110. Alternatively, gaming session information may periodically be written to floppy disks or other intermediate storage devices, when the memory 612 gets full.

In operation, the operator inserts the probe 630 into the intelligent data device reader 112, generally in the same manner as a player would insert a portable data device 130. For example, if the portable data device 130 is a smart card, and the intelligent data device reader 112 includes a smart card interface, then the operator would insert the probe 630 in the slot of the smart card interface intended to receive smart cards. The operator then triggers the extraction of data from the gaming device 110, by manually pressing a button, or entering a code on a keypad, or otherwise generating a manual input. Alternatively, the presence of the probe 630 may be automatically detected by the intelligent data device reader 112, which then proceeds to transmit accumulated gaming session information to the data extraction device 600 via the communication link established by the probe 630. The intelligent data device reader 112 may store, for example, hundreds or thousands of the last gaming sessions played at the machine. In a presently preferred embodiment, the intelligent data device reader 112 stores the last 3000 gaming sessions played at the machine.

Figure 7:
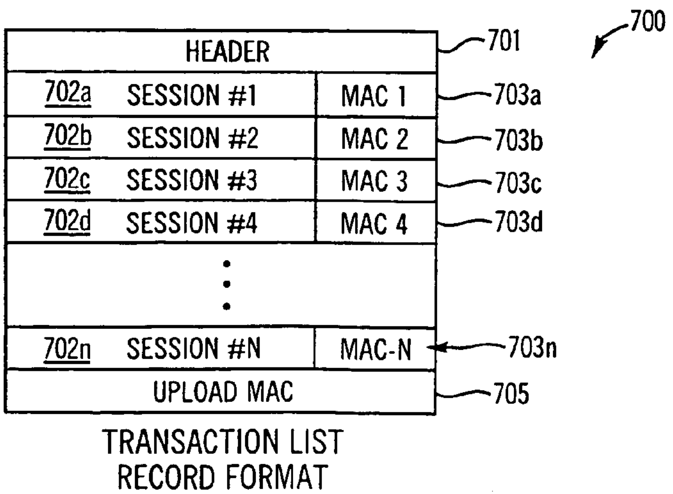
FIG. 7 is a diagram of a portion of a transaction list file format.

FIGS. 7 and 8A–8E are diagrams illustrating various formats in which data is transferred from the intelligent data device reader 112 to the data extraction device 600, and stored therein. In a preferred embodiment, the gaming session information is made secure and tamper-resistant by providing a special integrity code (referred to as a "MAC") for each gaming session record, and then again by providing a separate MAC for all of the gaming sessions transmitted with the file as a group, so as to prevent the erasure of an entire gaming session. FIG. 7 is a diagram of a portion of a transaction list file format illustrating the use of MACs to preserve data integrity. As shown in FIG. 7, a transaction list file 700 comprises a header record 701, one or more gaming session records 702*a*–702*n*, each of which has its own individual MAC 703*a*–703*n*, respectively, and a group MAC 705.

Figures 8A, 8B, 8C, 8D, 8E:
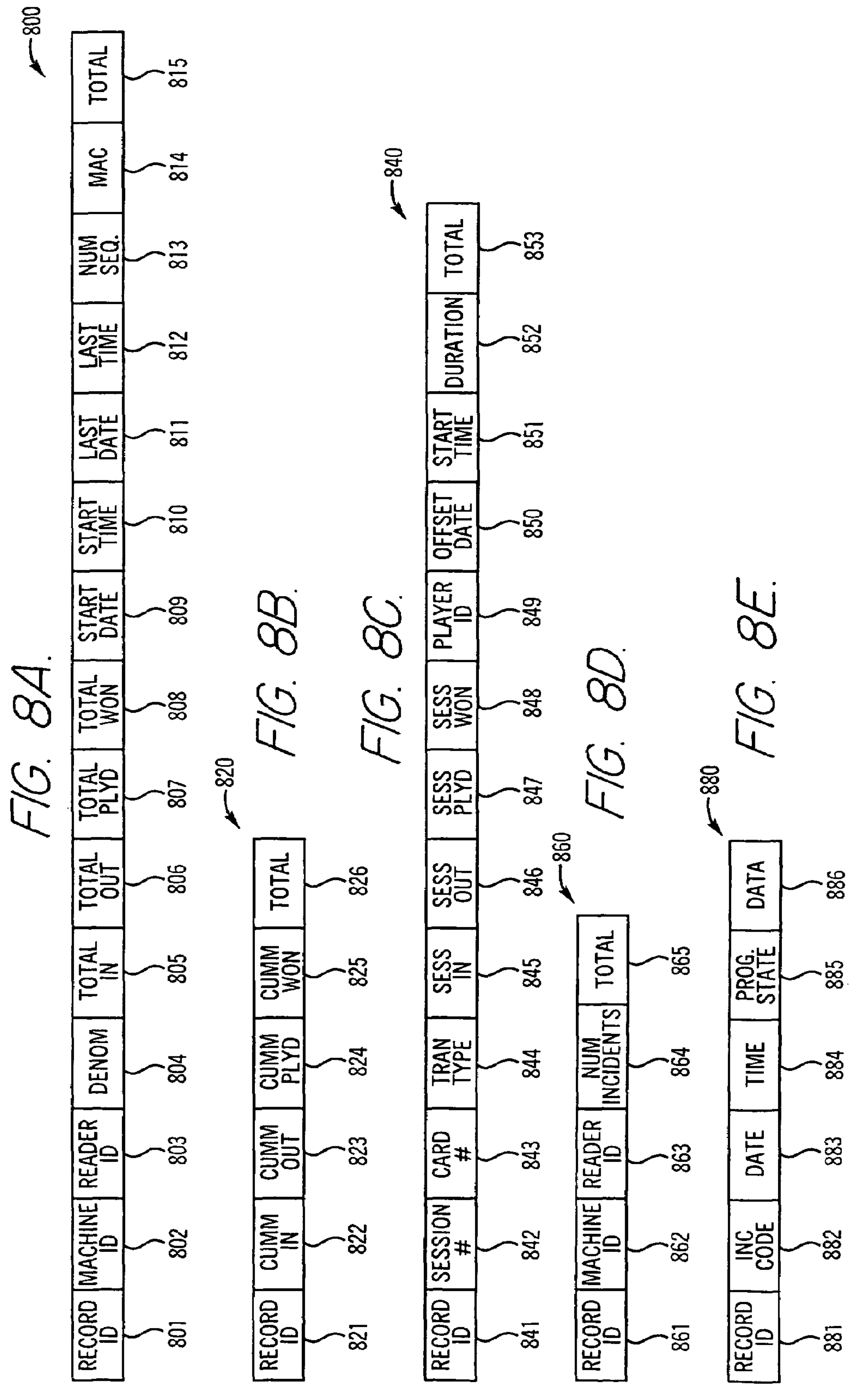
FIGS. 8A–8E are diagrams illustrating the format of records which may be included in the transaction list file transmitted from a data device reader to a data extraction device.

FIGS. 8A–8E are diagrams illustrating the format of records which may be included in the transaction list file transmitted from a data device reader to a data extraction device. FIGS. 8A and 8B show a header records 800 and 820 for transactions and meter readings, respectively. FIG. 8C shows a gaming session record 840. FIG. 8D shows a header record 860 for recorded incidents during previous gaming sessions, and FIG. 8E shows an incident file record 880.

Header record 800 shown in FIG. 8A may include, for example, a record number identifier field 801, a machine identifier field 802, a data device reader identifier field 803, a denomination field 804, a total money in field 805, a total money out field 806, a total money played 807 field, a total money won field 808, a start date field 809, a start time field 810, a last time field 812, a number of sessions field 813, and a total field 814.

Header record 820 shown in FIG. 8B may include, for example, a record identifier field 821, a cumulative money in field 822, cumulative money out field 823, cumulative money played field 824, a cumulative money won field 825, and a total field 826.

Gaming session record 840 shown in FIG. 8C may include, for example, a record identifier field 841, a session number field 842, a portable data device (e.g., smart card) identifier field 843, a transaction type field 844, a session money in field 845, a session money out field 846, a session money played field 847, a session money won field 848, a player identifier field 849, an offset data field 850, a start time field 851, a duration field 852, and total field 853.

Header record 860 shown in FIG. 8D may include, for example, a record identifier field 861, a machine identifier field 862, a data device reader identifier field 863, a number of incidents field 864, and a total field 865. Incident file record 880 shown in FIG. 8E may include, for example, a record identifier field 881, a incident type code field 882, a date of incident field 883, a time of incident field 884, a program status field 885, and a data message field 886.

The data extraction device 600 may, in a preferred embodiment, provide the operator with a choice of various commands. Examples of commands include: (1) read transaction list (i.e., gaming session information); (2) read incident list; (3) read parameters; (4) load new parameters; (5) erase transaction list (from memory of the intelligent data device reader 112); and (6) erase transaction list (from memory of the intelligent data device reader 112). The parameters which may be read with command (3) may include, for example, display messages, machine denomination ($1, $5, etc.), initial credit transfer amount, level at which to re-credit, and how much to re-credit. By using command (4), the parameters (including the machine denomination and display messages) may be re-programmed using the data extraction device 600.

Once the aggregate gaming session data has been downloaded from all of the gaming devices to the data extraction unit 600, the gaming session data is transferred to a central accounting and processing system. The gaming session data may be transferred via a physical cable connection through a data port 615 of the data extraction device 600 (using a physical cable 655 with a port connector 650 and a cable wire 651), or else may be written to one or more floppy disks or other storage media and read by computer equipment associated with the central accounting and processing system.

Further details concerning the entry of data into the central accounting and processing system are provided with reference to FIG. 9, which is a block diagram illustrating processing of transaction data extracted from a data device reader. As illustrated in FIG. 9, gaming device data (including transaction list data and incident data) is received from the data extraction device 140 (or 600) over an interface 901 (such as a parallel port connection, for example, or via a disk or other storage medium). The transaction data is validated by validation function routine 915 by checking the MAC for each gaming session and checking the group MAC for all of the gaming sessions (see, e.g., FIG. 7). The running totals for each portable data device 130 are then updated by an update function routine 917. The transaction data is stored in a transaction database 925, and the incident data is stored in an incident database 926. A database interface 910 may format the data and otherwise facilitate storage in the transaction a database 925 or incident database 926. Via a user interface 941 (such as at a cashier station 120), an authorized employee or agent of the casino or gaming establishment may view the transaction or incident data by issuing a query to the database 925 or 926, respectively. A batch process 930 may be run on the information stored in the transaction database 925, to allow profiling or information gathering concerning particular players. Tracking of any of the types or fields of data obtained from the portable data devices 130 or the portable data extraction unit 140 may be done by the gaming establishment in a batch mode. The results of such tracking may provide a basis for the gaming establishment to issue coupons, gaming credits, or other perquisites to customers to encourage their continued business.

Figure 10:
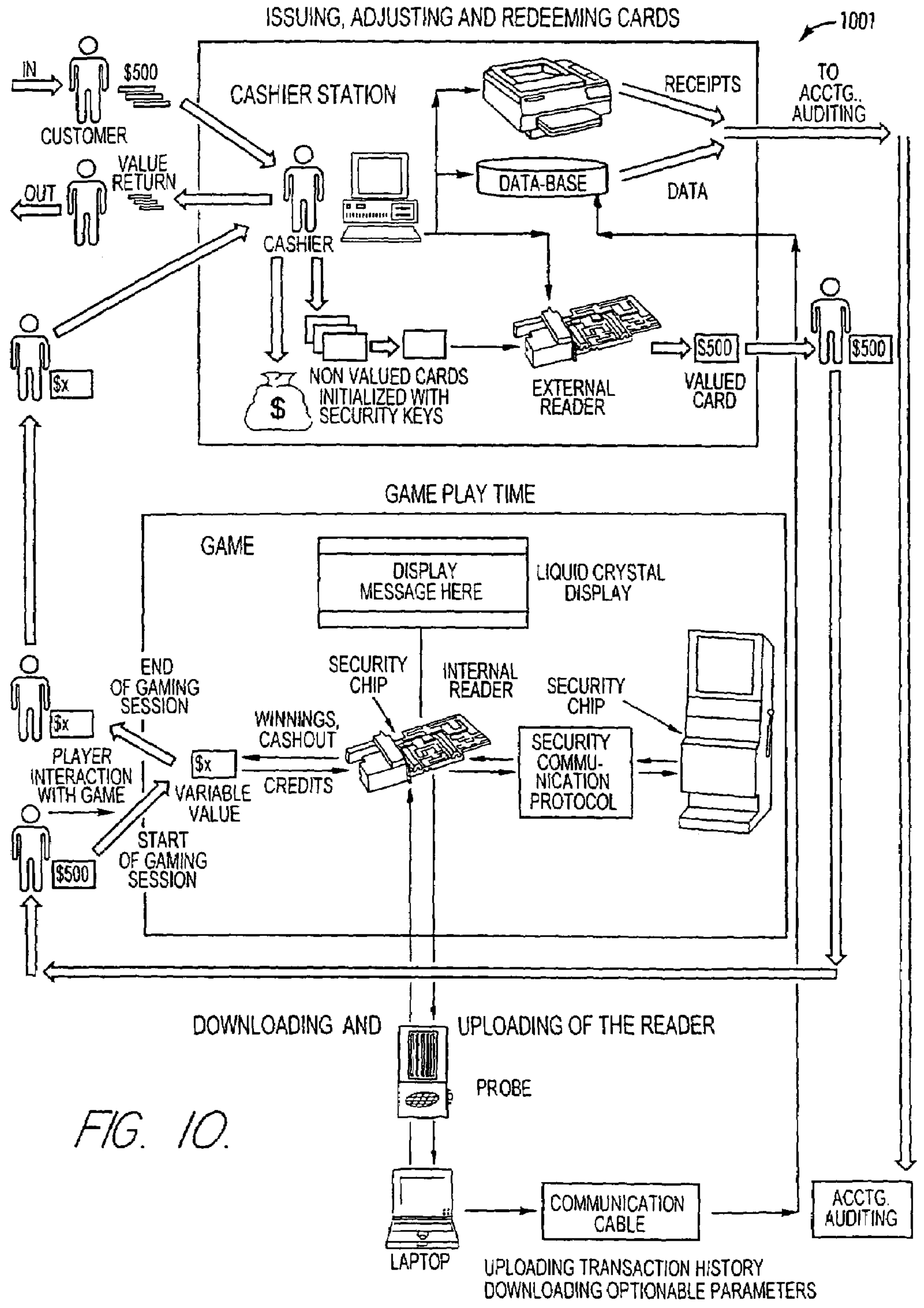
FIG. 10 is a diagram of a secure cashless gaming system illustrating interactions between players and the various components of the gaming system.

FIG. 10 is a diagram of one embodiment of a secure cashless gaming system 1001, illustrating from a graphical perspective, examples of interactions between players and the various components of the gaming system 1001. As illustrated in FIG. 10, players can obtain variable amount portable data devices (such as smart cards) from a cashier station, and utilize them in various gaming devices as may be provided by the gaming establishment. Information stored in the intelligent data device readers (designated as "internal reader" of the "game" in FIG. 10) may be read out using a portable data extractor, such as a laptop or other computerized device connected to a probe.

Figure 11:
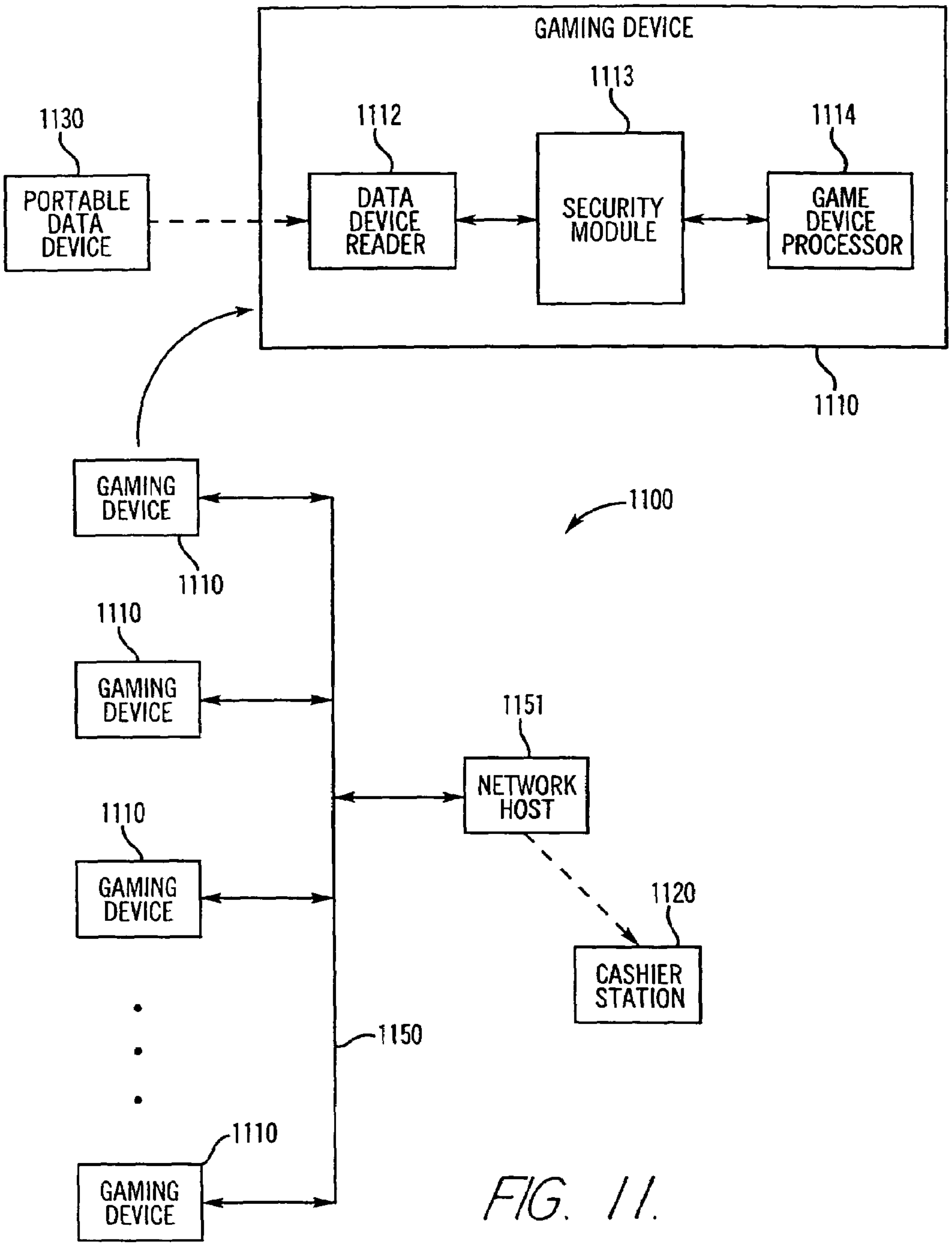
FIG. 11 is a diagram of a gaming device system wherein on-line gaming devices having intelligent data device readers are connected to a centralized network

FIG. 11 is a diagram of a cashless gaming system 1100 using on-line gaming devices 1110 having intelligent data device readers connected to a network host 1151 in a centralized network configuration. In the embodiment illustrated in FIG. 11, a network host 1151 communicates with the various on-line gaming devices 1110 over a network communication bus 1150. Each gaming device 1110, similar to those shown in FIG. 1, comprises an intelligent data device reader 1112, a game device processor 1114, and a security module 1113 interposed between the intelligent data device reader 1112 and game device processor. The data device reader 1112 accepts and reads portable data devices 1113, in a manner similar to that described for FIG. 1. The intelligent data device reader 1112 also stores gaming session data as previously explained herein.

Rather than using a portable data extractor to obtain the gaming session data stored in the intelligent data device reader 1112, the gaming session data is transferred to the network host 1151 during convenient periods of time, depending on the traffic at the network host 1151. In most, if not all, conventional on-line gaming systems, the gaming devices transmit gaming information to a network host for each gaming transaction. The network host thus can get overwhelmed when the attached gaming devices are very busy, and bottlenecks or slow response of the network host can occur. In the embodiment illustrated in FIG. 11, on the other hand, the intelligent data device reader 1112 alleviates the processing burden on the network host 1151 by temporarily storing gaming session information that may accrue over hours or even days, until the network host 1151 requests it. With such a configuration, the network host 1151 need only perform a fraction of the processing of conventional on-line gaming systems.

As further illustrated in FIG. 11, the network host 1150 may be connected to a cashier station 1120, which is generally of the same character as that described with respect to FIG. 1. Players can receive portable data devices 1130 from the cashier station 1120, or else can redeem remaining credits on portable data devices 1130 after they have been used, by taking them to the cashier station 1120.

The content and format of the gaming session (and related) data stored by the intelligent data device reader 1112 may take the format, for example, which is shown in FIGS. 8A–8E. Transferring information in such a format would generally require an adaptation to a standard network communication protocol format, such as SAS or SDS.

Figure 12:
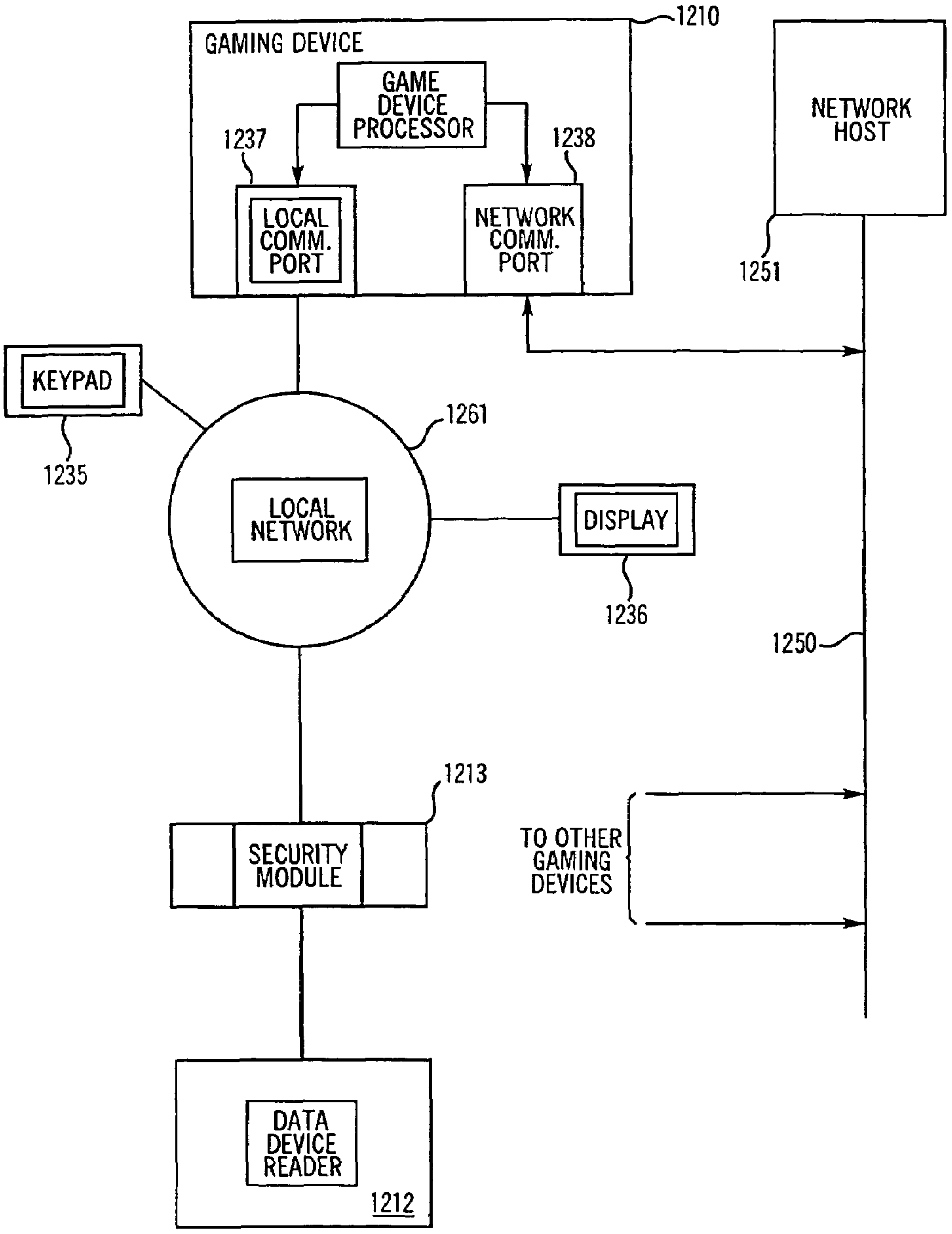
FIG. 12 is a diagram illustrating one manner of connecting a gaming device to a centralized network in accordance with one embodiment as disclosed herein.
Figure 13:
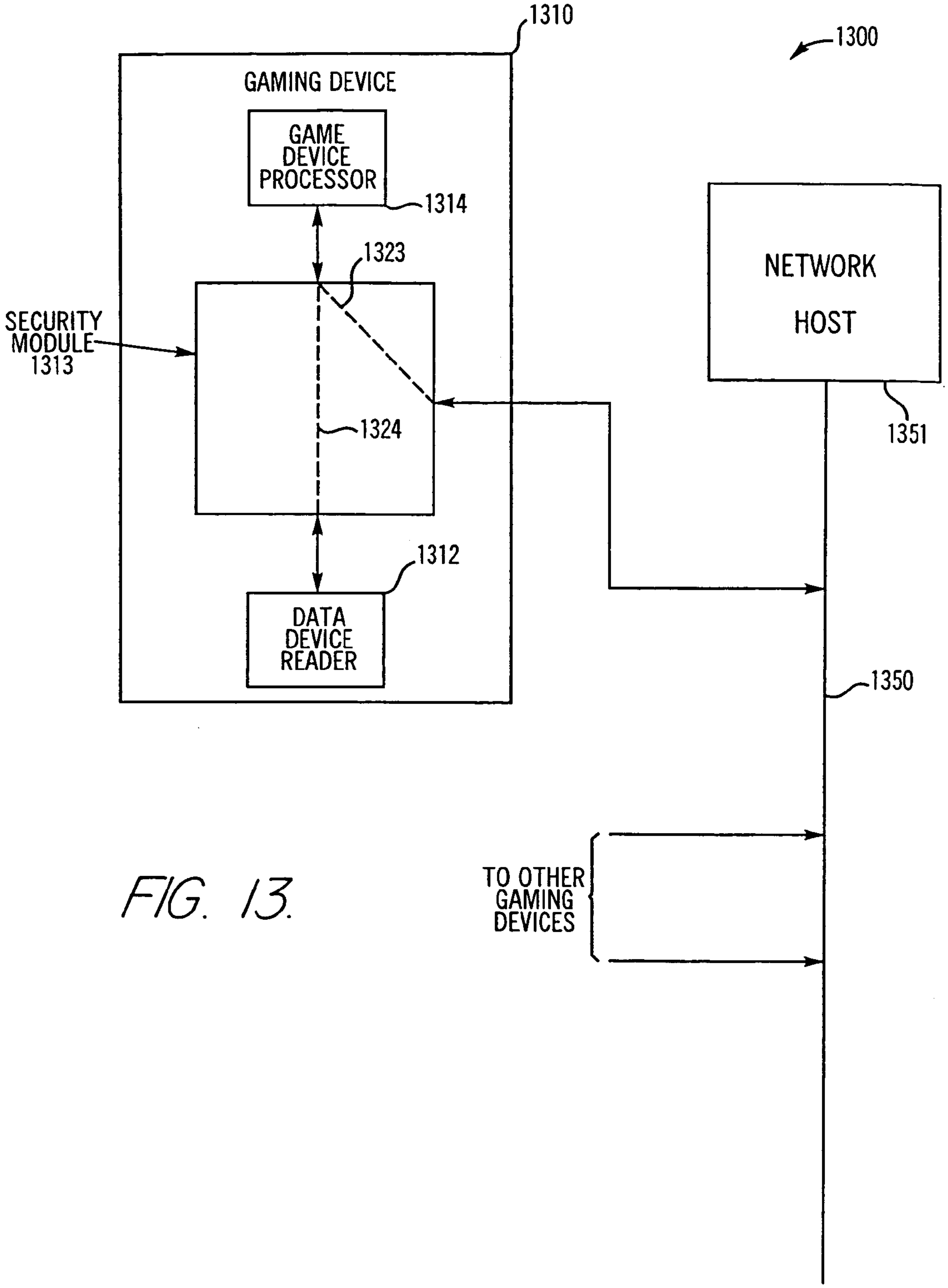
FIG. 13 is a diagram illustrating another manner of connecting a gaming device to a centralized network, in accordance with another embodiment as disclosed herein.

There are a variety of ways in which the intelligent data device reader 1112 may be connected to the network communication bus 1150 for communication with to the network host 1151. Two examples of such connection are shown in FIGS. 12 and 13, respectively. In the first example, shown in FIG. 12, a gaming device 1210 includes the game device processor 1214 connected to both a network communication port 1238 and a local communication port 1237. The game device processor 1214 selects between the local communication port 1237 and the network communication port 1238 as circumstances dictate. The local communication port 1237 is connected to a local area network including a local network bus 1261. The local network includes a security module 1213, and may optionally include a keyboard 1235, a display 1236, or any other additional component desired. The security module 1213 is connected to an intelligent data device reader 1212. The security module 1213 and intelligent data device reader 1212 are in most respects analogous to the security module 113 and intelligent data device reader 112 depicted in FIG. 1. However, rather than extracting data from the intelligent data device reader 1212 using a portable data extractor (as in a preferred embodiment in accordance with FIG. 1), instead the gaming session data is transmitted over the network communication bus 1250 to the network host 1251. The transfer of the gaming session data can be initiated by either the intelligent data device reader 1212, the game device processor 1214, or the network host 1251. The game device processor 1214 acts as the intermediary between the intelligent data device reader 1212 and the network host 1251. The intelligent data device reader 1212 transfers gaming session data to the game device processor 1214 via the local communication port 1237, and the game device processor 1214 then forwards the gaming session data to the network host 1251 via the network communication port 1238. The gaming session data need not necessarily be formatted with MACs, depending upon the level of security of the lines connecting the network host 1251 to the gaming device 1210.

FIG. 13 is a diagram illustrating another manner of connecting a gaming device to a network host. As illustrated in FIG. 13, a gaming device 1310 includes a game device processor 1314, and intelligent data device reader 1312, and a security module 1313 interposed between the game device processor 1314 and the intelligent data device reader 1312.

The security module 1313 internally has a "T" data path configuration, such that data may be routed over a first data path 1324 between the intelligent data device reader 1312 and the game device processor 1314, or else over a second data path 1323 between the game device processor 1314 and the network host 1351. In operation, when the gaming device 1310 is in a cash mode, the security module 1313 allows the game device processor 1314 to communicate freely with the network host 1351. However, when a portable data device is inserted in the intelligent data device reader 1312, and when the gaming device 1310 enters a cashless mode after the portable data device and intelligent data device reader 1312 are authenticated, the security module 1313 temporarily shuts down data path 1323 between the game device processor 1314 and the network host 1351, until the gaming session is complete. The embodiment shown in FIG. 13 thereby allows gaming devices having only a single communication port to have a cash or cashless capability, and still be connected to a centralized network host 1351 for on-line control.

In a number of embodiments that have been discussed above and/or illustrated in the drawings, specific types of interfaces (such as RS-232) have been enumerated. It should be understood that no limitation is intended by the specific type of interface that has been included as part of the various embodiments, and those skilled in the art will recognize that various alternative serial or parallel interfaces may be used, depending upon such things as cost, available space, preferred protocol, and other design considerations which are routinely addressed by engineers.

While preferred embodiments of the invention have been described herein, many variations are possible which remain within the concept and scope of the invention. Such variations would become clear to one of ordinary skill in the art after inspection of the specification and the drawings. The invention therefore is not to be restricted except within the spirit and scope of any appended claims.

What is claimed is:

1. A security device for use in a cashless system wherein portable data devices may be used to conduct cashless transactions, comprising:

a data device reader adapted to receive and read portable data devices;

a host device physically proximate to said data device reader, said host device comprising a host device processor; and a security module interposed between said data device reader and said host device processor and uniquely identified with said host device, said security module preventing completion of a transaction involving said data device reader and said host device processor unless said data device reader is successfully cross-authenticated with said security module when a portable data device is presented to and read by said data device reader, independent of any authentication of said portable data device by said data device reader.

2. The security device of claim 1, wherein said portable data devices comprise smart cams, and wherein said data device reader comprises a smart card reader.

3. The security device of claim 1, wherein said host device comprises an electronic gaming machine, and wherein said host device processor controls the electronic gaming machine.

4. The security device of claim 1, wherein, in addition to cross-authentication between said data device reader and said security module, said data device reader performs a cross-authentication check with the portable data device when it is presented to and read by said data device reader, and prevents a transaction with the portable data device if the cross-authentication check fails.

5. The security device of claim 4, wherein said data device reader further comprises an internal security access module, said internal security access module adapted to automatically perform cross-authentication between said portable data device and said data device reader, and to automatically perform cross-authentication between said data device reader and said security module.

6. The security device of claim 5, wherein said security module is configured to perform periodic authentication of said data device reader after the successful cross-authentication between said data device reader with said security module, and to prevent further communication between said data device reader and said host device processor if the periodic authentication fails.

7. The security device of claim 5, wherein said internal security access module is adapted to generste a first random number, encipher said first random number using a common key to generate a first enciphered random number, send said first enciphered random number to said security module, receive a second enciphered random number from said security module, decipher said second enciphered random number using said common key to generate a second random number, generate a session key from said first random number and said second random number, receive a third enciphered number from said security module, decipher said third enciphered number using said session key to generate an authentication test value, and verify that said authentication test value matches said second random number.

8. A security module for use in a gaming device, comprising;

a data device reader interface for connection to a data device reader;

a gaming device interface for connection to a game device processor; and a processor intemosed between said data device reader interface and said gaming device interface, said processor configured to prevent communication between said data device reader and said game device processor unless said data device reader is first authenticated;

wherein said processor is configured to perform a cross-authentication check with said data device reader, and wherein said data device reader is configured to perform a separate cross-authentication check with a portable data device.

9. A security module for use in a gaming device, comprising;

a data device reader interface for connection to a data device reader;

a gaming device interface for connection to a game device processor; and a processor interposed between said data device reader interface and said gaming device interface, said processor configured to prevent communication between said data device reader and said game device processor unless said data device reader is first authenticated;

wherein said processor is configured to generate a first random number, encipher said first random number using a common key to generate a first enciphered random number, send said first enciphered random number to said data device reader, receive a second enciphered random number from said data device reader, decipher said second enciphered random number using said common key to generate a second random number, generate a session key from said first random number and said second random number, receive a third enciphered number from said data device reader, decipher said third enciphered number using said session key to generate an authentication test value, and verify that said authentication test value matches said second random number.

10. A method of authentication for use in a cashless system wherein portable data devices may be used to conduct cashless transactions, said method comprising:

reading a portable data device with a data device reader physically proximate to a host device, said host device comprising a host device processor;

performing a cross-authentication between said data device reader and a security module uniquely identified with said host device when a portable data device is presented to and read by said data device reader, said security module interposed between said data device reader and said host device processor; and preventing completion of a transaction involving said data device reader and said host device processor unless said data device reader is successfully cross-authenticated with said security module, independent of any authentication of said portable data device by said data device reader.

11. The method of claim 10, wherein said host device comprises an electronic gaming machine, and wherein said host device processor controls the electronic gaming machine.

12. The method of claim 10, further comprising the step of cross-authenticating the portable data device with the data device reader.

13. A method of authentication for use in a cashless system wherein portable data devices may be used to conduct cashless transactions, said method comprising:

reading a portable data device with a data device reader physically proximate to a host device, said host device comprising a host device processor;

performing a cross-authentication between a said data device reader and a security module uniquely identified with said host device when a portable data device is presented to and read by said data device reader; and preventing completion of a transaction involving said data device reader and said host device processor unless said data device reader is successfully cross-authenticated with said security module, independent of any authentication of said portable data device by said data device reader;

wherein said data device reader is configured to perform the following steps in connection with cross-authenticating said security module:

generating a first random number at said data device reader;

enciphering said first random number using a common key to generate a first enciphered random number;

sending said first enciphered random number to said security module;

receiving, at said data device reader, a second enciphered random number from said security module;

deciphering said second enciphered random number using said common key to generate a second random number;

generating, at said data device reader, a session key from said first random number and said second random number;

receiving a third enciphered number from said security module, said third enciphered number comprising said first random number having been enciphered by said security module using said session key;

deciphering, at said data device reader, said third enciphered number using said session key to generate a first authentication test value; and verifying that said first authentication test value matches said first random number.

14. The method of claim 13, wherein said security module is configured to perform the following steps in connection with cross-authenticating said data device reader:

generating a second random number at said security module;

enciphering said second random number using a common key to generate said second enciphered random number;

sending said second enciphered random number to said data device reader;

receiving said first enciphered random number from said data device reader;

deciphering said first enciphered random number using said common key to generate said first random number;

generating, at said security module, said session key from said first random number and said second random number;

receiving a fourth enciphered number from said data device reader, said fourth enciphered number comprising said second random number having been enciphered by said data device reader using said session key;

deciphering, at said security module, said fourth enciphered number using said session key to generate a second authentication test value; and verifying that said second authentication test value matches said second random number.

* * * * *